United States Patent
Abdelli et al.

(10) Patent No.: US 12,391,394 B2
(45) Date of Patent: Aug. 19, 2025

(54) HIGH VOLTAGE CONVERTER FOR USE AS ELECTRIC POWER SUPPLY

(71) Applicant: MagniX USA, Inc., Redmond, WA (US)

(72) Inventors: Youcef Abdelli, Redmond, WA (US); Roei Ganzarski, Redmond, WA (US)

(73) Assignee: magniX USA Inc., Everett, WA (US)

( * ) Notice: Subject to any disclaimer, the term of this patent is extended or adjusted under 35 U.S.C. 154(b) by 133 days.

(21) Appl. No.: 18/205,782

(22) Filed: Jun. 5, 2023

(65) Prior Publication Data

US 2023/0318420 A1 Oct. 5, 2023

Related U.S. Application Data

(63) Continuation of application No. 16/888,809, filed on May 31, 2020, now Pat. No. 11,711,003.

(Continued)

(51) Int. Cl.
*H02K 16/00* (2006.01)
*B64D 27/24* (2024.01)
(Continued)

(52) U.S. Cl.
CPC ............. *H02K 16/00* (2013.01); *B64D 27/24* (2013.01); *B64D 31/02* (2013.01); *B64D 33/08* (2013.01);
(Continued)

(58) Field of Classification Search
CPC ........ H02K 16/00; H02K 11/21; H02K 11/30; H02K 5/203; H02K 5/225; H02K 7/116;
(Continued)

(56) References Cited

U.S. PATENT DOCUMENTS

| | | |
|---|---|---|
| 2,635,699 A | 4/1953 | Richmond et al. |
| 3,781,616 A | 12/1973 | Mokrytzki et al. |

(Continued)

FOREIGN PATENT DOCUMENTS

| | | |
|---|---|---|
| CN | 101771267 A | 7/2010 |
| CN | 202307414 U | 7/2012 |

(Continued)

OTHER PUBLICATIONS

Office Action dated Jan. 3, 2024 received in U.S. Appl. No. 16/888,824, 37 pages.

(Continued)

*Primary Examiner* — Lincoln D Donovan
*Assistant Examiner* — James G Yeaman
(74) *Attorney, Agent, or Firm* — Scully, Scott, Murphy & Presser, P.C.

(57) ABSTRACT

An electric power supply is described that has direct-current (DC) to alternating-current (AC) circuitry adapted and configured to receive DC power input having a DC input voltage and convert the DC power input to multi-phase, alternating-current (AC) power output. The DC to AC circuitry includes an electromagnetic interference (EMI) noise filter to suppress EMI noise, wherein the EMI noise filter comprises two, electrically insulated, conductive rails configured and adapted to receive the DC power input, ferrite material at least partially surrounding the two conductive rails, and a current sensing element positioned in a gap in the ferrite material and configured to measure leakage current escaping to ground.

30 Claims, 9 Drawing Sheets

Related U.S. Application Data

(60) Provisional application No. 62/855,143, filed on May 31, 2019, provisional application No. 62/855,147, filed on May 31, 2019, provisional application No. 62/855,151, filed on May 31, 2019.

(51) Int. Cl.
| | | |
|---|---|---|
| *B64D 31/02* | (2006.01) | |
| *B64D 33/08* | (2006.01) | |
| *B64D 41/00* | (2006.01) | |
| *F16H 57/04* | (2010.01) | |
| *H02J 7/34* | (2006.01) | |
| *H02K 5/20* | (2006.01) | |
| *H02K 5/22* | (2006.01) | |
| *H02K 7/116* | (2006.01) | |
| *H02K 9/197* | (2006.01) | |
| *H02K 11/21* | (2016.01) | |
| *H02K 11/30* | (2016.01) | |
| *H02P 6/10* | (2006.01) | |
| *H02P 25/16* | (2006.01) | |
| *H02P 27/08* | (2006.01) | |

(52) U.S. Cl.
CPC ......... *B64D 41/00* (2013.01); *F16H 57/0476* (2013.01); *H02J 7/345* (2013.01); *H02K 5/203* (2021.01); *H02K 5/225* (2013.01); *H02K 7/116* (2013.01); *H02K 9/197* (2013.01); *H02K 11/21* (2016.01); *H02K 11/30* (2016.01); *H02P 6/10* (2013.01); *H02P 25/16* (2013.01); *H02P 27/08* (2013.01); *B64D 2221/00* (2013.01); *H02K 2213/06* (2013.01)

(58) Field of Classification Search
CPC .... H02K 9/197; H02K 2213/06; B64D 27/24; B64D 31/02; B64D 33/08; B64D 41/00; B64D 2221/00; F16H 57/0476; H02J 7/345; H02P 6/10; H02P 25/16; H02P 27/08

See application file for complete search history.

(56) References Cited

U.S. PATENT DOCUMENTS

| | | |
|---|---|---|
| 4,418,777 A | 12/1983 | Stockton |
| 4,743,828 A | 5/1988 | Jahns et al. |
| 5,982,067 A | 11/1999 | Sebastian et al. |
| 7,053,508 B2 | 5/2006 | Kusase et al. |
| 7,462,968 B2 | 12/2008 | Kusase et al. |
| 7,990,011 B2 | 8/2011 | Yoshino et al. |
| 8,405,479 B1 | 3/2013 | Cleveland |
| 8,476,989 B2 * | 7/2013 | Herron ................ H05K 1/0233 |
| | | 333/112 |
| 8,575,880 B2 | 11/2013 | Grantz |
| 8,653,710 B2 | 2/2014 | Takahashi et al. |
| 8,786,156 B2 | 7/2014 | Hino et al. |
| 8,842,452 B2 | 9/2014 | Nielsen |
| 9,221,326 B2 | 12/2015 | Steffen et al. |
| 9,236,775 B2 | 1/2016 | Takahashi et al. |
| 9,270,154 B2 | 2/2016 | Hibbs et al. |
| 9,450,461 B2 | 9/2016 | Labbe et al. |
| 9,479,037 B2 * | 10/2016 | Bailey et al. |
| 9,559,554 B2 | 1/2017 | Gasparin et al. |
| 9,595,705 B1 | 3/2017 | Buckhout |
| 9,755,463 B2 | 9/2017 | Klassen et al. |
| 9,853,588 B2 | 12/2017 | Green et al. |
| 9,943,016 B2 * | 4/2018 | Pietrantonio ...... H05K 7/20927 |
| 10,008,912 B2 | 6/2018 | Davey et al. |
| 10,123,450 B2 | 11/2018 | Sarti |
| 10,247,758 B2 * | 4/2019 | Milano ................ G01R 15/205 |
| 10,272,767 B1 | 4/2019 | Tang et al. |
| 10,326,344 B2 | 6/2019 | Hamann et al. |
| 10,660,196 B2 | 5/2020 | Amaducci et al. |
| 2003/0029654 A1 | 2/2003 | Shimane et al. |
| 2004/0111869 A1 | 6/2004 | Mikkelsen |
| 2007/0176499 A1 | 8/2007 | Holmes et al. |
| 2008/0019062 A1 | 1/2008 | Dooley |
| 2009/0195090 A1 | 8/2009 | Rittenhouse |
| 2010/0038473 A1 | 2/2010 | Schneider et al. |
| 2010/0046129 A1 | 2/2010 | Mikrut |
| 2010/0097169 A1 | 4/2010 | Earle |
| 2011/0024567 A1 | 2/2011 | Blackwelder et al. |
| 2011/0133580 A1 | 6/2011 | Sugimoto et al. |
| 2011/0138765 A1 | 6/2011 | Lugg |
| 2012/0025032 A1 | 2/2012 | Hopdjanian et al. |
| 2012/0055727 A1 | 3/2012 | Omiya et al. |
| 2012/0126731 A1 | 5/2012 | Wyrembra |
| 2012/0153718 A1 | 6/2012 | Rawlinson et al. |
| 2012/0194040 A1 | 8/2012 | Hao et al. |
| 2012/0257429 A1 | 10/2012 | Dong et al. |
| 2012/0262019 A1 | 10/2012 | Smith et al. |
| 2013/0285485 A1 | 10/2013 | Song et al. |
| 2014/0022681 A1 | 1/2014 | Mitsutani |
| 2014/0042948 A1 | 2/2014 | Green et al. |
| 2014/0056726 A1 | 2/2014 | Garrard et al. |
| 2014/0070634 A1 | 3/2014 | Legros et al. |
| 2014/0139161 A1 | 5/2014 | Ueda |
| 2014/0167548 A1 | 6/2014 | Kong |
| 2014/0191613 A1 | 7/2014 | Mariotto |
| 2014/0361646 A1 | 12/2014 | Saito et al. |
| 2015/0018168 A1 | 1/2015 | Davey et al. |
| 2015/0061440 A1 | 3/2015 | Catalan |
| 2015/0091486 A1 | 4/2015 | Chandrasekharan et al. |
| 2015/0093272 A1 | 4/2015 | Körner et al. |
| 2015/0180296 A1 | 6/2015 | Ravaud et al. |
| 2015/0270735 A1 | 9/2015 | Smith |
| 2015/0318745 A1 | 11/2015 | Matsuoka |
| 2015/0326166 A1 | 11/2015 | Hayashi |
| 2016/0045841 A1 | 2/2016 | Kaplan et al. |
| 2016/0065016 A1 | 3/2016 | Seufert et al. |
| 2016/0082858 A1 | 3/2016 | Yang et al. |
| 2016/0105092 A1 | 4/2016 | Takakura et al. |
| 2016/0107758 A1 | 4/2016 | Esteyne et al. |
| 2016/0141999 A1 | 5/2016 | Han et al. |
| 2016/0144725 A1 | 5/2016 | Nozawa |
| 2016/0176305 A1 * | 6/2016 | James ................ H02J 3/38 |
| | | 307/26 |
| 2016/0258266 A1 | 9/2016 | Frick |
| 2017/0237383 A1 | 8/2017 | Buffenbarger et al. |
| 2017/0288286 A1 * | 10/2017 | Buckhout .......... H01M 50/519 |
| 2018/0049314 A1 * | 2/2018 | Amaducci ............ H05K 1/0216 |
| 2018/0105059 A1 * | 4/2018 | Namou .............. G01R 31/3271 |
| 2018/0145623 A1 | 5/2018 | Xiang et al. |
| 2018/0236882 A1 | 8/2018 | Wang et al. |
| 2018/0294760 A1 | 10/2018 | Koenig et al. |
| 2018/0309349 A1 | 10/2018 | Sigmar |
| 2018/0323737 A1 | 11/2018 | Masillamani |
| 2018/0331540 A1 | 11/2018 | Mao et al. |
| 2018/0342933 A1 | 11/2018 | Tangudu et al. |
| 2019/0061654 A1 * | 2/2019 | Tsuji ................... B60R 16/03 |
| 2019/0074625 A1 | 3/2019 | Rhys |
| 2019/0131851 A1 | 5/2019 | Herb |
| 2019/0202300 A1 | 7/2019 | Pastor et al. |
| 2020/0149427 A1 | 5/2020 | Long |
| 2020/0381985 A1 | 12/2020 | Sercombe et al. |
| 2021/0366642 A1 | 11/2021 | Herrmann et al. |

FOREIGN PATENT DOCUMENTS

| | | | |
|---|---|---|---|
| CN | 203463636 U | | 3/2014 |
| CN | 104052221 A | | 9/2014 |
| CN | 104057779 A | | 9/2014 |
| CN | 203933369 U | | 11/2014 |
| CN | 102530219 B | | 6/2015 |
| CN | 204517697 U | * | 7/2015 |
| CN | 102714081 B | | 11/2015 |
| CN | 103795203 B | | 4/2016 |
| CN | 106374701 A | | 2/2017 |
| CN | 206211715 U | | 5/2017 |
| CN | 109921708 A | | 6/2019 |
| CN | 209805612 U | | 12/2019 |

(56) References Cited

FOREIGN PATENT DOCUMENTS

| | | | |
|---|---|---|---|
| CN | 108429370 | B | 5/2020 |
| CN | 108781023 | B | 2/2021 |
| DE | 10240241 | A1 | 3/2004 |
| DE | 102013208976 | A1 | 12/2014 |
| DE | 102015201960 | A1 | 8/2016 |
| DE | 102016200081 | A1 | 7/2017 |
| DE | 102017213543 | B4 | 8/2019 |
| DE | 102006037003 | B4 | 3/2023 |
| EP | 0522015 | B1 | 8/2000 |
| EP | 1453187 | B1 | 9/2009 |
| EP | 1860756 | B1 | 9/2012 |
| EP | 2592726 | A2 | 5/2013 |
| EP | 2602515 | A1 | 6/2013 |
| EP | 2774853 | A1 | 9/2014 |
| EP | 2799322 | B1 | 2/2019 |
| FR | 3030383 | B1 | 2/2017 |
| FR | 3036551 | B1 | 5/2018 |
| GB | 2503671 | A | 1/2014 |
| JP | 2006-060952 | A | 3/2006 |
| JP | 2010057290 | A | 3/2010 |
| JP | 2017147878 | A | 8/2017 |
| JP | 2018182927 | A * | 11/2018 ............ H02M 1/088 |
| JP | 2019169499 | A | 10/2019 |
| KR | 20140050885 | A | 4/2014 |
| KR | 20150004259 | A | 1/2015 |
| KR | 1020180042529 | | 4/2018 |
| RU | 2015156857 | A | 7/2017 |
| WO | 2013056083 | A1 | 4/2013 |
| WO | 2015101870 | A1 | 7/2015 |
| WO | 2018030343 | A1 | 2/2018 |
| WO | 2018137955 | A1 | 8/2018 |
| WO | 2018218314 | A1 | 12/2018 |
| WO | 2019017495 | A1 | 1/2019 |
| WO | 2019041915 | A1 | 3/2019 |
| WO | 2019056095 | A1 | 3/2019 |
| WO | 2020067259 | A1 | 4/2020 |

OTHER PUBLICATIONS

Combined Search and Examination Report issued by the United Kingdom Patent Office dated Sep. 18, 2023 received in a related foreign application, 4 pages.

Office Action dated Jul. 14, 2023 received in U.S. Appl. No. 16/889,246, 18 pages.
Office Action dated Jul. 24, 2024 received in U.S. Appl. No. 16/889,246, 23 pages.
Office Action dated Aug. 24, 2023 received in U.S. Appl. No. 16/888,824, 36 pages.
Search Report from the United Kingdom Patent Office dated Oct. 29, 2020 in GB Application No. GB2008166.7, 9 pages.
Office Action dated May 31, 2023 received in U.S. Appl. No. 16/888,824, 36 pages.
Search Report from the United Kingdom Patent Office dated Oct. 28, 2022 in GB Application No. GB2211540.6, 4 pages.
Combined Examination and Search Report mailed Nov. 27, 2020 in GB Application No. GB2008171.7, 10 pages.
Combined Examination and Search Report mailed Jul. 5, 2022 in GB Application No. GB2202640.5, 9 pages.
Office Action dated May 28, 2024 received in U.S. Appl. No. 16/888,824, 38 Pages.
Combined Examination and Search Report Mailed Nov. 27, 2020 In GB2008178.2.
Office Action dated Apr. 28, 2022 received in U.S. Appl. No. 16/888,824, 20 pages.
Office Action dated Sep. 15, 2022 received in U.S. Appl. No. 16/888,824, 26 pages.
Office Action dated Nov. 17, 2022 received in U.S. Appl. No. 16/889,246, 16 pages.
Search Report dated Oct. 21, 2022 issued by the United Kingdom Patent Office in a corresponding foreign application, 5 pages.
Office Action dated Feb. 6, 2023 received in U.S. Appl. No. 16/888,824, 35 pages.
Search Report issued by the United Kingdom Patent Office dated Apr. 4, 2023 received in a corresponding foreign application, 4 pages.
Combined Search and Examination Report issued by the United Kingdom Patent Office dated Oct. 6, 2023 received in a related foreign application, 7 pages.
Search Report issued by the United Kingdom Patent Office dated Jun. 29, 2023 received in a related foreign application, 8 pages.

* cited by examiner

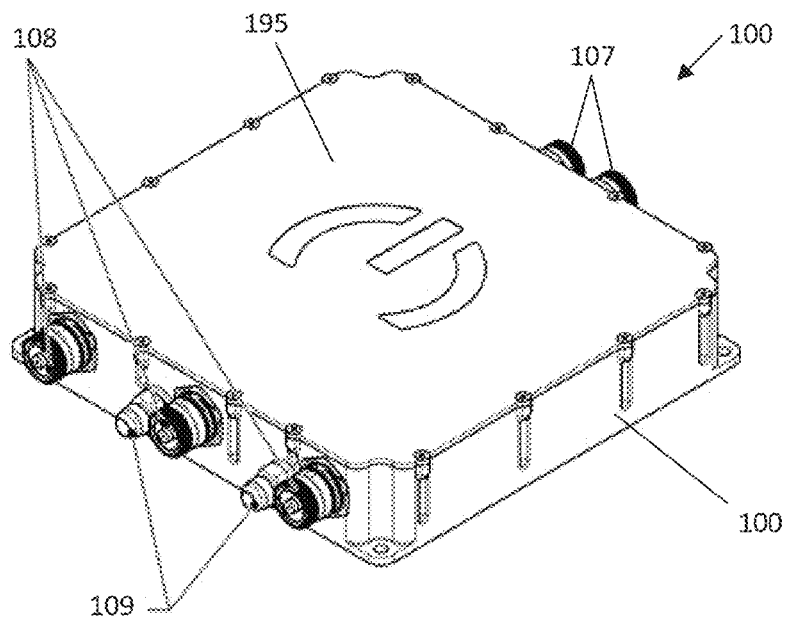
FIG. 3
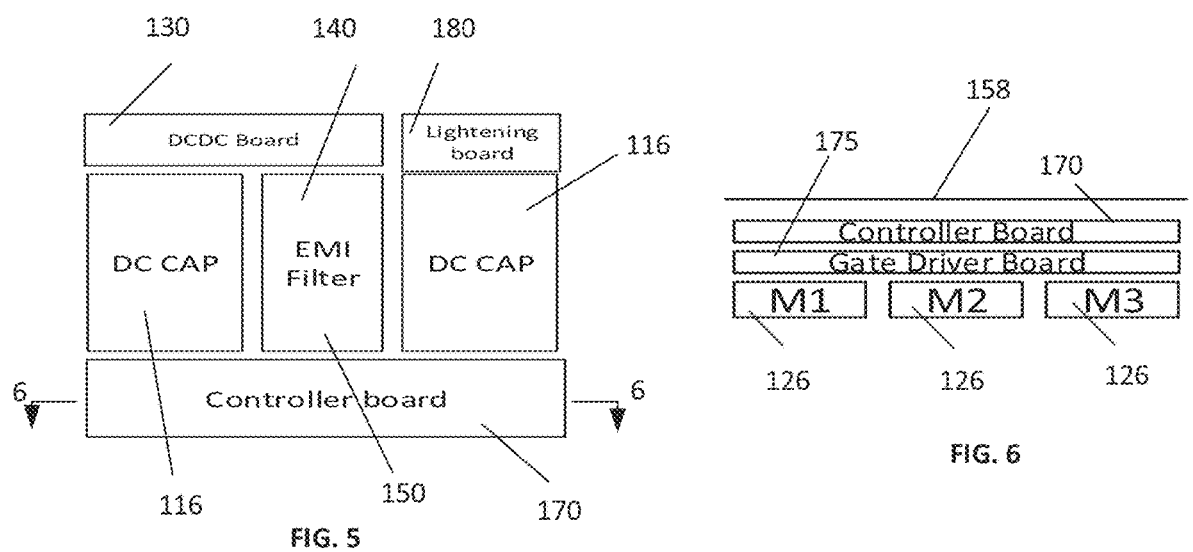
FIG. 5
FIG. 6 ic power supply. The multiuse motor controller further includes a high-voltage, direct-current (HVDC) side and a high-voltage, alternating-current (HVAC) side, where the HVDC side has a plurality of input connectors to receive the HVDC and the HVAC

HIGH VOLTAGE CONVERTER FOR USE AS ELECTRIC POWER SUPPLY

CROSS REFERENCE TO RELATED APPLICATIONS

This application is a continuation of U.S. patent application Ser. No. 16/888,809, filed May 31, 2020, which claims the benefit of provisional U.S. Patent Application No. 62/855,143, filed on May 31, 2019; 62/855,147 filed on May 31, 2019; and 62/855,151 filed on May 31, 2019, the entire content and disclosure of which is incorporated herein by reference.

BACKGROUND

This disclosure relates to an electrical power supply system, including a high-power, high-voltage, multi-use converter/inverter for converting high-voltage, direct-current (HVDC) to high-power, preferably multiphase high-voltage, alternating-current (HVAC). The power supply systems can have multiple uses, such as, for example, as a motor controller to power electric motors for aircraft, preferably including manned aircraft, or as a power converter for converting alternating-current (AC) to high-power, high-voltage, direct-current.

There is a need for a light-weight, reliable, high-density, high-voltage, high-power electric power supply system for diverse applications, including, for example, to power electric motors, particularly for high load and/or high-torque situations, such as, for example, for use in electric powered aircraft, e.g., manned aircraft. There is a further need for a high-power density, high-efficiency, highly-reliable motor controller and electric power supply that exhibits high thermal, vibration, and electromagnetic interference (EMI) performance characteristics.

SUMMARY OF THE INVENTION

The summary of the disclosure is given to aid the understanding of an electric power supply system including a high-power, high-voltage converter/inverter and its method of operation, preferably to power and control an electric motor. The present disclosure is directed to a person of ordinary skill in the art. It should be understood that various aspects and features of the disclosure may advantageously be used separately in some instances, or in combination with other aspects and features of the disclosure in other instances.

In one or more embodiments, an electric power supply system to supply high-power, high-voltage, alternating-current (HVAC) is disclosed. The high-power electric power supply in one or more embodiments comprises circuitry adapted and configured to receive high-voltage, direct-current (HVDC) and convert the high-voltage, direct-current (HVDC) to high-power, preferably high-voltage, multiphase alternating-current (HVAC). The electric power supply includes a housing containing and protecting the circuitry, the housing having a plurality of input connectors to receive the high-voltage, direct-current (HVDC) and a plurality of output connectors to output the high-power, high-voltage, alternating-current (HVAC). The high-voltage, direct-current (HVDC) input to the power supply in an embodiment can be as low as from about 320 volts to as high as about 820 volts, more preferably about 480-750 Vdc. The power supply preferably has an output power of about 50 to about 160 kilowatts, with about 10 Volts RMS to about 350 Volts RMS, and about zero to about 400 Amps RMS at a frequency range of about 10 Hertz (Hz) to about 1000 Hz. In an aspect the power supply has a power density of 10 kw per kg (kw/kg) or greater, preferably 14 kw/kg or greater. The electric power supply in an aspect is about 97% efficient or better, including about 98% efficient, or greater.

The electric power supply in an embodiment includes Silicon Carbide (SiC) MosFET power switches. Gate driver circuitry in an embodiment is used to drive the power switches. The electric power supply in one or more aspects include DC pre-charge capacitors that are pre-charged for operation, and are connected to and used as a power source for the power switches. The electric power supply in one or more embodiments incorporates an integrated EMI filter to protect against electromagnetic interference (EMI), the integrated EMI filter delivering HVDC input power to the DC capacitors. The EMI filter in an aspect includes ferrite rings surrounding the rail conductors and in an embodiment incorporating ground fault detection (GFD). In an embodiment, the GFD includes a sensing element, preferably a linear Hall-effect sensor, to detect leakage current escaping to ground, and in an embodiment includes a Hall-effect sensor incorporated into a gap in one of one or more ferrite rings surrounding the conductor rails delivering power to the DC pre-charge capacitors.

The electric power supply preferably further comprises low-voltage converter circuitry to convert the HVDC to low-voltage, direct-current (LVDC) of about 12 to about 50 volts direct-current, more preferably DC voltage as low as about 18 volts to as high as about 32 volts, and more preferably about 28 volts. The low-voltage converter circuitry or Power Supply Unit (PSU) in an embodiment is used to power the gate driver circuitry that drives the power switches and other, preferably all other, internal electronics boards contained within the power supply, including a controller board containing processors to monitor and control the electric power supply. The low-voltage converter circuitry optionally is further used to pre-charge HVDC capacitors. The electric power supply optionally further comprises a controller board having a processor and other ancillary circuitry to run monitoring software and hardware. The electric power supply can further comprise circuitry to read temperature and pressure sensor data. The housing of the electric power supply in one or more embodiments has input connectors communicating with the circuitry to read temperature sensor data. The housing of the electric power supply in one or more aspects further includes a cooling system, preferably a liquid cooling system incorporated within the electric power supply, and in an aspect integrated within the housing of the electric power supply. The cooling supply in an embodiment includes one or more coolant input connectors and one or more coolant output connectors, the one or more input connectors communicate with a flow path or channel through the power supply that communicates with the one or more coolant output connectors, the coolant input connectors and flow path configured and adapted to receive liquid coolant. The housing in an embodiment includes a vent to equalize pressure between the interior and the exterior of the housing.

In one or more embodiments, a multiuse motor controller is disclosed, the multiuse motor controller including circuitry adapted and configured to receive high-voltage, direct-current (HVDC) and convert the HVDC to high-power, high-voltage, alternating-current (HVAC) or to receive high-voltage alternating-current (HVAC) and convert the HVAC to high-power, high-voltage, direct-current (HVDC); and a housing containing and protecting the circuitry, the housing having a plurality of input connectors to receive the HVDC or HVAC and a plurality of output connectors to output the high-power HVDC or high-power HVAC. The multiuse motor controller preferably uses the same hardware and control to generate HVDC from HVAC as to generate HVAC from HVDC. The multiuse motor controller in an aspect produces HVAC power of about 50 to about 160 kilowatts, and has a power density of about 10 kw per kg or greater, preferably 14 kw/kg or greater. The multiuse motor controller or power supply optionally further includes circuitry and software to provide protection and monitoring of at least one of the group of short circuit, over-current, over-voltage, ground fault detection, temperature, and combinations thereof.

A motor controller system is also disclosed where the system has a plurality of electric power supplies or motor controllers, preferably a plurality of high-power electric power supplies or motor controllers, wherein each power supply or motor controller is modular and scalable. In one or more aspects, multiple, multiphase power supplies, e.g., dual, multi-phase motor controllers, can be incorporated into a single housing that preferably uses a single integrated cooling system. In an aspect, the motor controller system is configured and adapted to be operable if one or more of the power supplies or motor controllers is inoperable, downgraded, and/or faulty.

BRIEF DESCRIPTION OF THE DRAWINGS

The various aspects, features, and embodiments of the electric power supply system, e.g., voltage converter/inverter, and its method of operation will be better understood when read in conjunction with the figures provided. Embodiments are provided in the figures for the purpose of illustrating aspects, features, and various embodiments of the electric power supply system, e.g., the electric voltage converter/inverter, and its operation, but the disclosure should not be limited to the precise arrangement, structures, assemblies, subassemblies, systems, features, aspects, circuitry, functional units, embodiments, methods, processes, or devices shown, and the arrangement, structure, assembly, subassembly, system, features, aspects, circuitry, functional units, embodiments, methods, processes, and devices shown may be used singularly or in combination with other arrangements, structures, assemblies, subassemblies, systems, features, aspects, circuitry, functional units, embodiments, details, methods, processes, and/or devices.

FIG. 3 shows a back perspective view of the electric power supply system/motor controller of FIG. 1.

FIG. 5 shows a block diagram representation of a top view of the electric power supply system/motor controller of FIG. 1 with the top cover plate removed.

FIG. 6 shows a block diagram representation of a cross-section view of the power supply/motor controller taken along line 6-6 of FIG. 5.

DETAILED DESCRIPTION

Figure 1:
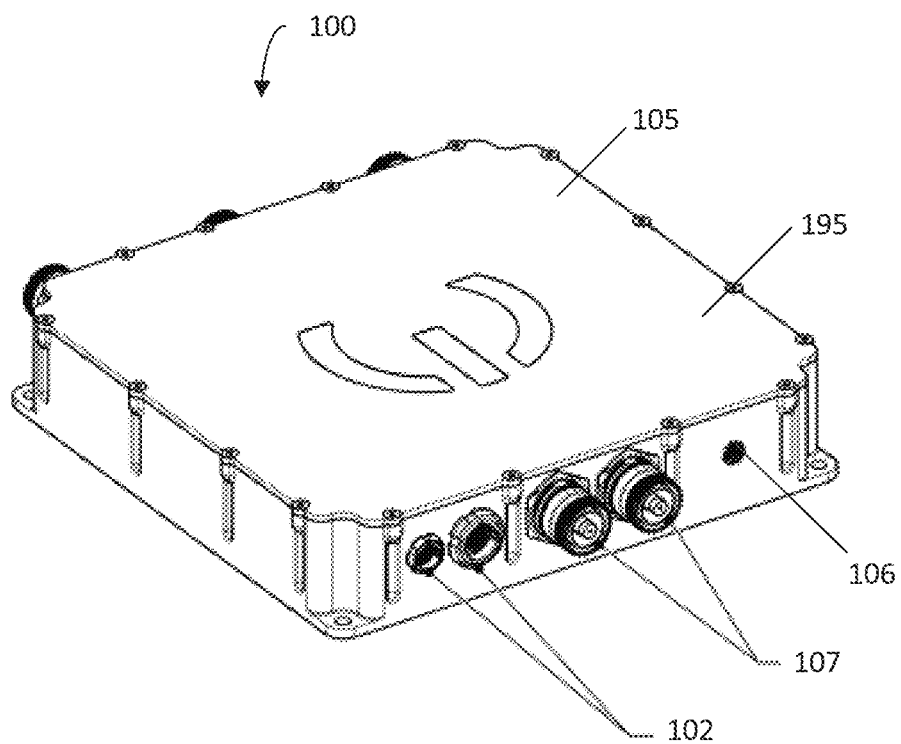
FIG. 1 shows a top front perspective view of an embodiment of an electric power supply system, e.g., a voltage converter/inverter, for use in an aspect as, for example, an electric motor controller.

The following description is made for illustrating the general principles of the invention and is not meant to limit the inventive concepts claimed herein. In the following detailed description, numerous details are set forth in order to provide an understanding of a power-supply, its architectural structure, components, and method of operation, particularly configured as a motor controller for electric motors, however, it will be understood by those skilled in the art that different and numerous embodiments of the power supply, its architectural structure, methods of operation, and uses may be practiced without those specific details, and the claims and invention should not be limited to the arrangements, structures, embodiments, assemblies, subassemblies, features, functional units, circuitry, processes, methods, aspects, features, details, or uses specifically described and shown herein. Further, particular features, aspects, functions, circuitry, details, and embodiments described herein can be used in combination with other described features, aspects, functions, circuitry, details, and/or embodiments in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It should also be noted that, as used in the specification and the appended claims, the singular forms "a," "an" and "the" include plural referents unless otherwise specified.

FIGS. 1-8 show an electric power supply system 100 configured to convert/invert high-voltage, direct-current (HVDC) of about 320 to about 820 dc volts, preferably about 480 to about 750 dc volts, and more preferably about 500 to about 650 dc volts, to high-voltage, alternating-current (HVAC), preferably high-power, HVAC. The electric power supply system 100 in one or more embodiments outputs a multiphase HVAC that varies between 0 volts and about 0.61 to about 0.78 times the HVDC voltage in terms of root mean squared (RMS) voltage when measured line to line between phases. More specifically, the multiphase HVAC varies between 0 volts and about 0.707 times the HVDC voltage input in terms of fundamental root-mean-squared (RMS) voltage when measured line to line between phases when the controller is employing a Space Vector Pulse Width Modulation (SVPWM) scheme. In one or more embodiments for example, the electric power supply 100 outputs about 50 to about 160 kilowatts (power) having about 10 to about 350 volts RMS and about zero to about 400 amps RMS of alternating current, preferably multiphase alternating current. Each phase of the preferred multiphase alternating-current ranges from 10 Hertz (Hz) to as high as 1000 Hz, with a preferred operational (non-surge) range of about 10 to about 720 Hz.

In a further aspect, the electric power supply 100 additionally converts high-voltage, alternating-current (HVAC) to high-voltage, direct-current (HVDC), preferably high-power, HVAC. In one or more embodiments, the electric power supply converts high-voltage, alternating-current to HVDC of about 50 to 160 kilowatts having direct-current of about 10 to about 400 amps and a voltage range of about 320 to about 820 volts. The electric power supply 100 in one or more embodiments has one or more circuits and/or components for converting the HVAC to HVDC. In one or more embodiments, the same hardware and control can be used and applied to generate high-voltage, alternating-current from direct-current, or vice versa regenerate high-voltage, direct-current from alternating-current.

The electric power supply system 100, also referred to as a converter or inverter, is in one or more embodiments configured as an electric motor controller 100. While the electric power supply system 100 is configured and described for use as a motor controller 100 for supplying and regulating power to an electric motor it should be appreciated that the power supply system 100 and/or features, aspects, teaching, and methods disclosed herein can have multiple additional and/or alternative applications, and that the electric power supply system 100 is not limited to powering electric motors. The disclosed electric power supply system 100 has features and advantages beneficial to electric power supply systems for use in electric motors for aviation applications, and particularly aircraft, e.g., manned aircraft, applications, as well as other aviation, aerospace and automotive applications, however, the power supply, converter/inverter, and/or motor controller and its features will be applicable to other applications.

The electric power supply system 100, e.g., motor controller, of FIGS. 1-8, in addition to converting high-voltage, DC (HVDC) to high-voltage, alternating-current (HVAC), preferably high-power HVAC, regulates the alternating-current delivered to the electric motor in terms of timing, magnitude, and frequency. The motor controller 100 in one or more aspects regulates the alternating-current delivered to the electric motor, direction of rotation, and the rotational speed of the electric motor. The output alternating-current (AC) is regulated by the motor controller 100 to control torque and/or limit output speed of the electric motor. In one or more embodiments, the output alternating-current varies from about zero to about 400 amps RMS, at a frequency from 10 Hertz (Hz) up to 1000 Hz, with a non-surge operating range of about 10 to about 720 Hz. The regulation of the AC output of the motor controller, and the regulation of the connected electric motor or electric motor module, is achieved by regulating the duty cycle and timing of the output current of the motor controller relative to the angular position of the back-EMF voltage vector of the connected electric motor. The control of electric motors, e.g., Permanent Magnet Synchronous Machines, is generally known to those skilled in the art.

The motor controller 100, e.g., the electric power supply, is configured and packaged for delivering high-power of about 10 to 160 kilowatts, more preferably about 50 to 160 kilowatts, and with a power density of about 10 kw/kg or greater, preferably 14 kw/kg or greater, while being highly efficient, and achieving low electromagnetic interference (EMI) susceptibility and emission. The phrase about 10 kw/kg or greater is intended to cover power density that may be less than 10 kw/kg, but in proximity to 10 kw/kg, and power densities that are equal to or greater than 10 kw/kg. The housing 105 of the motor controller 100 could suitably be constructed from either a conductive metal, e.g., aluminum, or composite aircraft structural material, e.g., carbon fiber, with an integral conductive shield and meets lightning strike protocols for the aviation industry, such as, for example, B4 designation from RTCA DO-160G Section 22. In one or more embodiments, the power (motor) controller 100 meets the DO160 standard. In an embodiment, the high-power electric power supply 100, e.g., motor controller, is tightly packaged providing high-density power, and light-weight in a low-volume package. The motor controller 100 in an embodiment is packaged in a housing 105 that measures about 328-333 mm in length, about 335-340 mm in width, and about 70-80 mm in height, and weighs about 11.0 to about 11-12 kg, more preferably about 11.8 kg, including with the coolant, while delivering upto about 160 kilowatts of power.

The power density is preferably achieved with EMI protection, e.g., high EMI resistance and immunity, and cooling systems, e.g., heat exchangers, so that the motor controller 100 operates within stable temperature zones. The motor controller 100, e.g., the electric power supply, has high thermal, EMI, and vibration performances and stability. The motor controller 100, e.g., the electric power system, in one or more embodiments includes high cooling performance, including, in examples a liquid cooling system. The power controller 100 is highly efficient with low power losses, e.g., low voltage rise time (overvoltage spikes) dV/dt of about 16 kV/µs or less. The motor controller 100 preferably has lightening protection up to the B4 waveform given by the test procedure in Section 22 of RTCA DO160G. In one or more embodiments, the power (motor) controller 100 meets the environmental requirements from the RTCA DO-160G Environmental Conditions and Test Procedures for Airborne Equipment standard, particularly the categories concerning performance at altitude, with temperature variation, conducted and radiated emissions (EMC/EMI), and vibration.

FIGS. 1-3, and 7-8, shows the power supply housing 105 with two (2) high-voltage, direct-current (HVDC) input connections 107. In one or more embodiments, the power supply 100 receives HVDC of about 320 volts to about 820 volts, more preferably about 480 volts to about 650 volts, with direct-current of about 200 amps up to about 400 amps. The high-voltage, direct-current (HVDC) supplied to the motor controller 100 in one or more embodiments can be supplied by one or more high-voltage, direct-current batteries (not shown), although other sources for the high-voltage, direct current (HVDC) are contemplated. In one or more embodiments, the motor controller 100 converts the input power, e.g., high-voltage, direct-current (HVDC) to multi-phase high-voltage, alternating-current (HVAC) output power, preferably multi-phase, high-power HVAC output. In one or more embodiments, the motor controller outputs three-phase, high-voltage, alternating-current. As shown in FIGS. 3-4 and 7-8, the power supply/motor controller housing 105 has three (3) alternating-current output connectors 108, one for each phase of output alternating-current, e.g., 108', 108", and 108'''. The motor controller preferably produces high-power HVAC and delivers to each connector 108', 108", and 108''' high-voltage of up to 820 volts, more preferably 800 volts, and alternating-current of about 100 to about 400 amps at a frequency of 10 Hz up to about 1,000 Hz. In one or more embodiments, there are current and voltage sensors in the motor controller 100 on the input and output sides. The input and output current and voltage sensors monitor and regulate the input and output power conditions, e.g., the voltage and current conditions.

Figure 2:
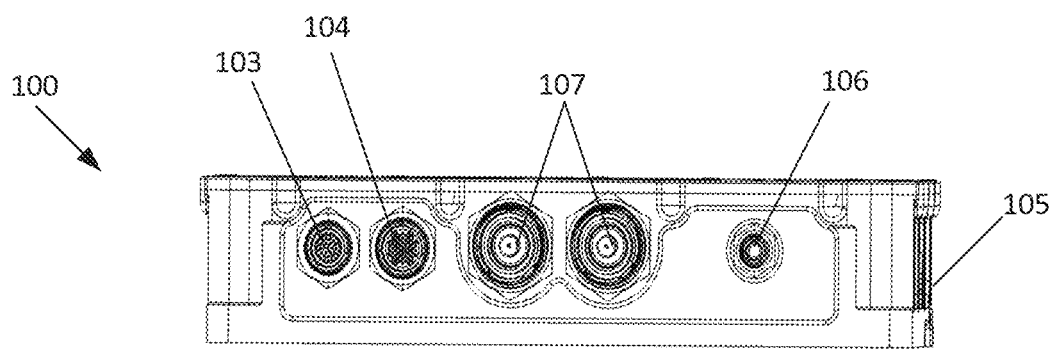
FIG. 2 shows a front side view of the electric power supply system/motor controller of FIG. 1.
Figure 4:
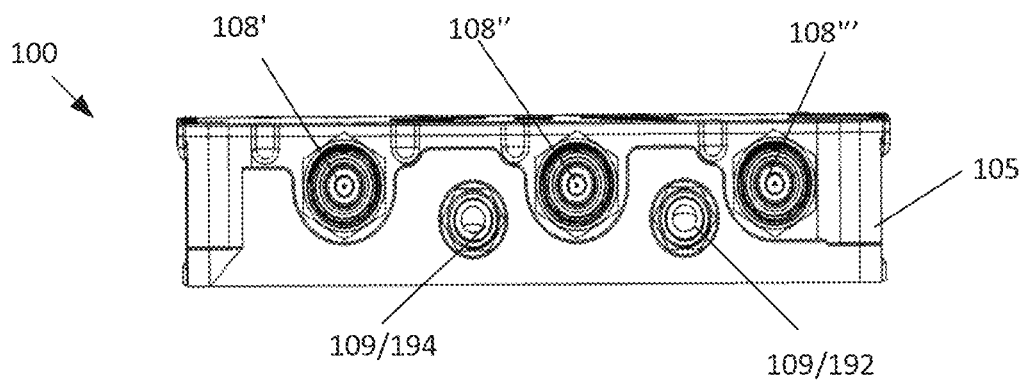
FIG. 4 shows a back side view of the electric power supply/motor controller of FIG. 1.
Figure 18:
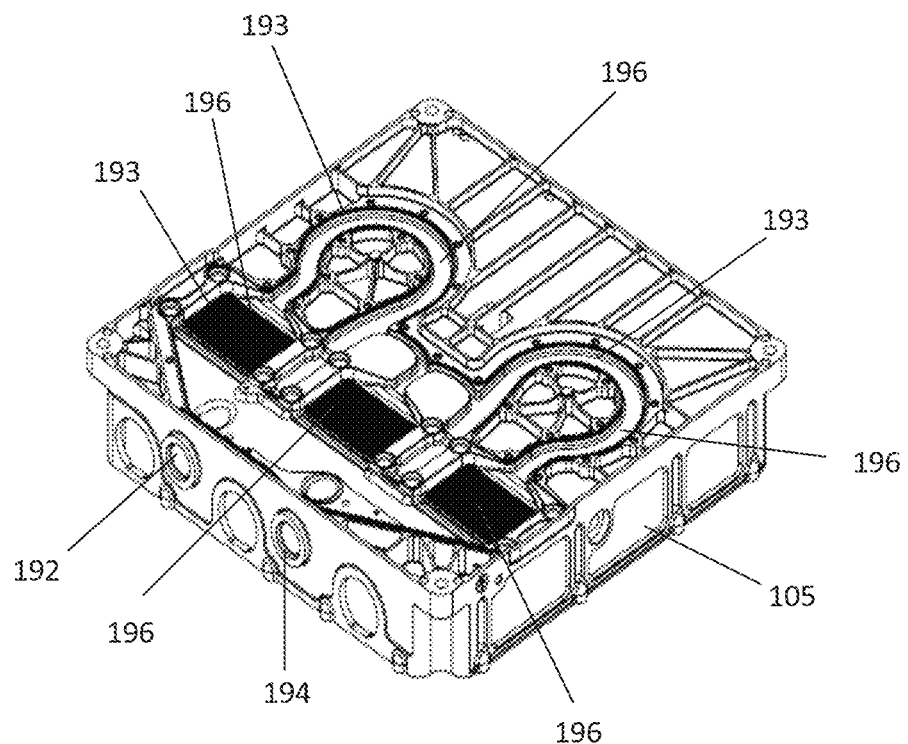
FIG. 18 shows a bottom perspective view of an example housing of the electric power supply/motor controller of FIG. 1 illustrating an example liquid cooling system.
Figure 19:
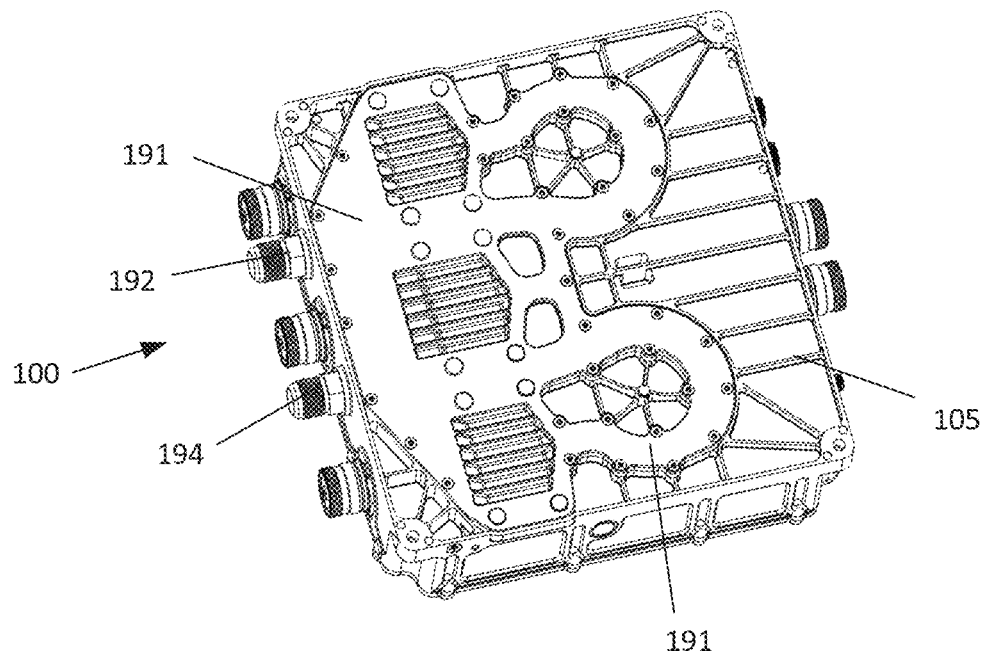
FIG. 19 shows a bottom perspective view of an example housing and bottom cover plate for the liquid cooling system used in the electric power supply/motor controller of FIG. 1.

In addition to the HVDC inputs 107 and HVAC outputs 108, the motor controller 100 has one or more inlet (192) and outlet (194) connectors 109 for coolant ingress into and egress out of the motor controller housing 105 as shown in FIGS. 3-4 and described further in connection with the cooling system 190 as shown more clearly in FIGS. 18-19. Preferably, the motor controller 100 uses liquid coolant for the purposes of transferring heat from the power switches, DC capacitors, and associated circuitry, as well as other circuitry, and preventing unacceptable temperatures and temperature rise in the motor controller circuits and components during operation as described in more detail below. The motor controller 100 also preferably includes internal temperature sensors, and also includes internal temperature monitoring hardware. In an embodiment, as shown in FIGS. 1-2, the motor controller 100 has input connectors 102 for control and sensor inputs for use by the control and monitoring software in the motor controller 100. The motor controller 100 preferably includes circuitry to read and convert signals from external temperature sensors (such as may be mounted in the motor or in sub-modules elsewhere in the system) for use by the control and monitoring software in the motor controller 100. The power supply 100, in one or more embodiments, has an input communication and sensor connection 103 that can be configured to communicate with a separate system controller if present (not shown). In this manner, the motor controller 100 receives an input signal from a system controller and controls the resulting torque by adjusting the HVAC output that is supplied by the motor controller 100 to the electric motor or other electrical appliance. The power supply or motor controller 100 in one or more embodiments has an input communication and sensor connection 104 that is configured to receive one or more input signals from an electric motor (not shown). Input connectors 104 receive various control inputs from, for example, the aircraft, feedback from the electric motors or loads, and/or other systems, e.g., other motor controllers, cooling systems, and/or the system controller, to monitor operations, and to control and regulate its HVAC output. The motor controller 100 in one or more embodiments identifies and manages fault conditions that arise within the motor controller 100, and in aspects faults within the electric motor or electric motor module.

Figure 8:
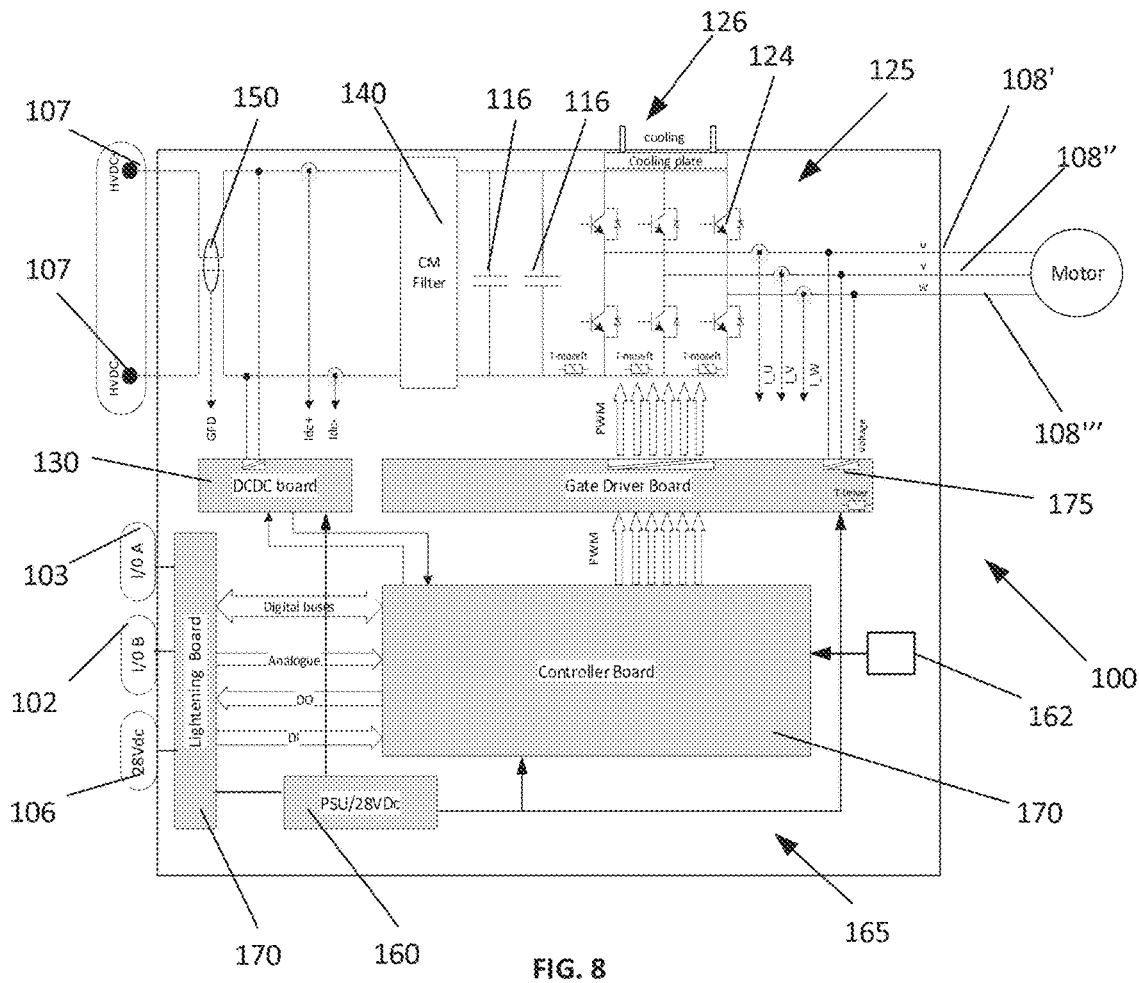
FIG. 8 shows a schematic representative block diagram of an embodiment of the functional units and their interconnections in the electric power supply/motor controller of FIG. 1.

As shown in FIGS. 1-2 and 8, the power supply 100, e.g., the motor controller 100, in an embodiment, includes a low-voltage, direct-current (LVDC) input connector 106 for receiving low-voltage, direct current (LVDC) to power the electronics as explained in more detail below. The LVDC input preferably is about twelve (12) to about fifty (50) volts, preferably about eighteen (18) to about thirty-two (32) volts, more preferably about twenty-eight (28) volts. The motor controller 100 optionally contains additional DC-DC converter circuitry 130 that converts the high-voltage DC (HVDC) from the HVDC power inputs 107 to low-voltage DC (LVDC) that is used to power the auxiliary and control circuitry as will be explained in greater detail below. In an embodiment, the DC-DC converter circuitry 130 preferably is included in the motor controller 100 as a redundant power source for the control and monitoring features of the motor controller 100 by converting the HVDC input of about 400-820 volts, more preferably about 480-650 volts, to about twelve (12) to about fifty (50) volts, preferably about eighteen (18) to about thirty-two (32) volts, more preferably about twenty-eight (28) volts to power the low-voltage circuits 165.

The motor controller 100 in one or more aspects has high-voltage circuitry 125 as shown in FIG. 8 for converting the HVDC input 107 to multiphase HVAC output 108 to power an electric appliance (e.g., an electric motor), and low-voltage circuitry 165 to power the auxiliary and control electronics controlling and managing the high-voltage circuitry as well as handling the system monitoring as will be explained in more detail below. The power supply/motor controller 100 includes a number of subsystems, functional units, assemblies, and/or circuitry configured to perform different functions as will be explained in more detail below. As shown in FIGS. 5-8 the motor controller 100, in one or more embodiments, includes DC capacitors 116 with a bus bar 117, power modules 126 containing power (transistor) switches 124, DC-DC converter circuitry board 130, an EMI filter 140, Ground Fault Detection (GFD) unit 150, EMI shielding 158, Power Supply Unit (PSU) 160, controller board 170, gate driver board 175, lightening board 180, and cooling system 190. In one or more embodiments, the motor controller 100 converts the input HVDC power, e.g., high-voltage of about 320-820 volts (more preferably about 480-650 volts) and about 100-400 amps, to multiphase high-voltage, alternating-current (HVAC) output power of about 50 to about 160 kilowatts at up to about 850 volts, more preferably about 820 volts, and about 100 to 400 amps RMS at a frequency from about 10 Hz to about as high as 1,000 Hz, and more preferably in a normal (non-high-load) range of about 10 Hz to about 720 Hz.

In a preferred embodiment, the power supply/motor controller 100 includes a multi-phase voltage source inverter circuitry portion 125 shown in FIG. 8. The inverter section 125, preferably high-voltage inverter circuitry section 125, of the motor controller 100 has circuitry and/or components that convert the DC input power 107, e.g., the high-voltage DC input power 107, to multiphase AC output power 108, preferably a multiphase high-power, high-voltage, alternating-current, preferably to power an electric motor for example for manned aircraft applications. The high-voltage inverter circuitry 125 includes, in one or more embodiments, Ground Fault Detection 150, an Electro-Magnetic Interference (EMI) filter 140, DC capacitors 116, and power modules 126 containing power switches 124 to convert the HVDC to HVAC. In one or more embodiments, the inverter circuitry 125 can also be used to convert HVAC to HVDC.

In a preferred embodiment, the power supply, e.g., the motor controller 100, contains one or more DC capacitors 116 as shown in FIGS. 5 and 7-9 to provide the required HVDC power to the power modules 126/power switches 124. The motor controller 100 uses DC capacitors 116 to provide power to the power switches 124 because the DC capacitors 116 permit rapid voltage change and power delivery required by the power switches 124, and serve as decoupling between the load (e.g., the electrical appliance/electric motor) and power source networks (e.g., high-voltage battery system). The DC capacitors 116 each have a capacitance of about 100 micro-Farads to about 400 micro-Farads, more preferably about 250-300 micro-Farads, for a total capacitance of about 200 micro-Farads to 800 micro-Farads, more preferably about 500 micro-Farads. In addition, the capacitors 116 have a voltage rating of about 100 to about 850 volts, more preferably about 750 volts to handle the HVDC. Moreover, since the capacitors 116 are for storing high-voltage and require high-reliability, their structure and construction is about 800 cm$^3$ each. Each DC capacitor 116 has a height of about 60 mm to about 65 mm, and a radius of about 100 mm to about 110 mm. While the motor controller 100 illustrates as shown in FIGS. 5 and 7-9 using two DC capacitors 116 in parallel, it should be appreciated that one capacitor, or more than two capacitors in parallel, may be utilized to perform the function of powering the power switches 124.

Figure 7:
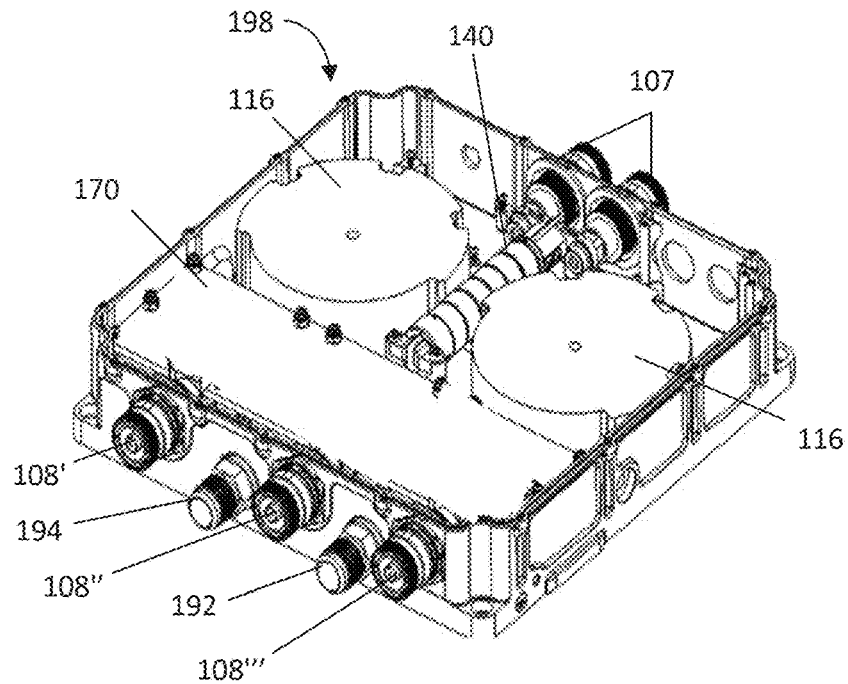
FIG. 7 shows a top perspective view of the electric power supply system/motor controller of FIG. 1 with the top cover plate, lightening board, and DC-DC converter board removed.
Figure 9:
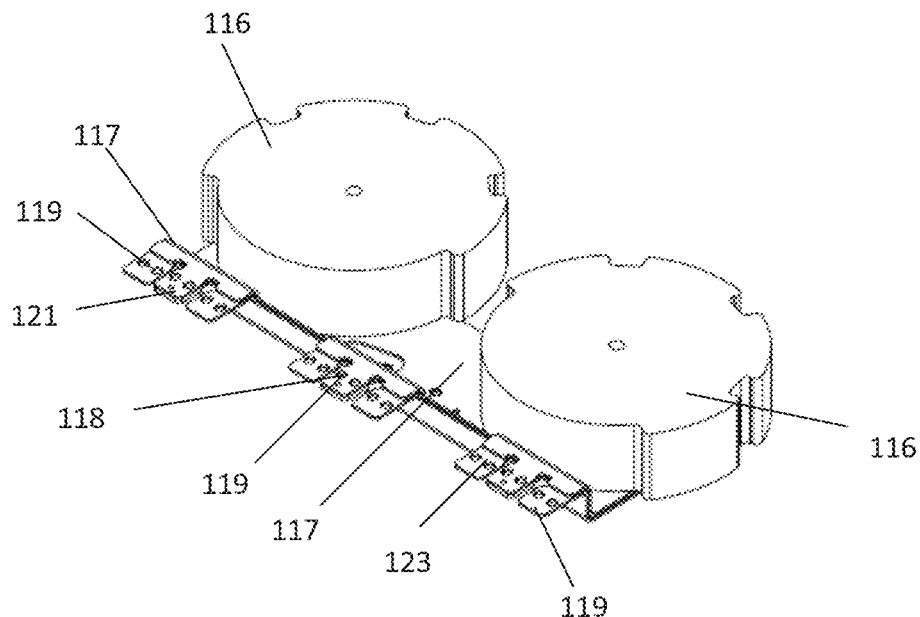
FIG. 9 shows an example embodiment of the DC capacitors and bus bar used to power the power switches in the electric power supply/motor controller of FIG. 1.

Bus bar 117 as shown in FIG. 8 receives HVDC power input 107 from the EMI filter 140, or optionally from the DCDC converter circuitry 130. The middle connector 118 of bus bar 117 as shown in FIGS. 7 and 9 receives HVDC that is delivered to the two DC capacitors 116, while each outboard connector 121, 123 receives the output from one of the capacitors 116, with the outboard connectors 121, 123 connected to, and which provide power (voltage and current) to, the power modules 126 containing the power switches 124. The bus bar 117 is positioned in proximity to and preferably adjacent to the power modules 126 containing power switches 124. More specifically, the bus bar 117 has three pads 119 that form connections to and from the DC capacitors 116. Each pad 119 receives two electrical connections. The middle connector 118 is spaced about 25 mm to about 30 mm from the out-board connectors 121 and 123. The bus bar 117 electrical connections and pathways are formed of conductive material, preferably aluminum, separated by insulting material, preferably flexible insulating material, forming a laminar bus bar.

Figure 10:
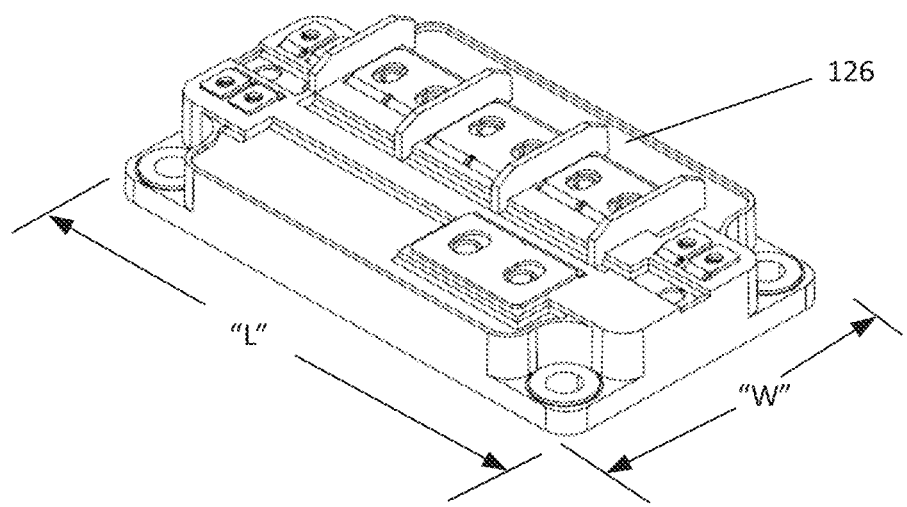
FIG. 10 shows an example embodiment of the power module containing power switches used in the electric power supply/motor controller of FIG. 1.

Motor controller 100 as shown in FIGS. 6, 8 and 10 uses power (transistor) switches 124, preferably Silicon Carbide (SiC) MosFETs, to convert the HVDC to HVAC, preferably high-power, multiphase HVAC. The motor controller 100 uses power switches 124, preferably Silicon Carbide MosFETs, for higher switching speed and reduced power losses. This reduction in power losses facilitates higher current capacity of about 400 Amps RMS in the switches 124 and increases the power density of the motor controller 100. The power switches 124, e.g., the SiC MosFets 124, are highly efficient providing less switching power losses. Each power switch 124 permits a rapid rise in voltage. The combination of multiple power switches 124 output multiphase HVAC 108, and more particularly three power switch modules 126 each containing two power switches 124 are configured to output three phases of HVAC 108', 108", and 108''', where each power module 126 produces one phase of HVAC 108. The motor controller 100 in an embodiment utilizes gate driver circuitry 175 to drive the power switches 124 based on the switching states output by the motor control software and hardware primarily contained on controller board 170. The gate driver circuitry 175 drives the six power switches 124 with different timing so that each power module 126 is 120 degrees out-of-phase from the other power modules 126. For example, if power module 126' produces HVAC 108' at zero degrees (no phase shift), then power module 126" produces HVAC 108" at a 120 degree later phase shift, and power module 126''' produces HVAC 108''' at a 240 degrees later phase shift.

Each power module 126 has two power switches 124, e.g., two Silicon Carbide (SiC) MosFets, one switch (MosFet) 124 configured to produce current in one direction and drive one half (½) of the HVAC output, the other power switch 124 configured to produce current in the other direction and drive the other half of the HVAC output, where both power switches (e.g., MosFets) 124 in the power module 126 together produce the HVAC output 108. The gate driver circuitry 175 triggers the two MosFet switches 124 in each power module 126 in a manner to produce the HVAC. Each power switch 124 receives triggering pulses from the gate driver circuitry 175 and HVDC. Each power module 126 as shown in FIG. 10 has a length "L" of about 105 mm to about 110 mm, a height "h" of about 60 mm to about 65 mm, and a width "W" of about 90 mm to about 95 mm, and weighs about 215 to about 225 grams, more preferably about 220 grams. The power modules 126 are rated for a maximum current of about 400 Amps RMS, and power of about 50 kw for this particular motor controller application (high-power output), but it should be appreciated that different rating could be used for different applications. It should also be appreciated that this example of motor controller 100 is designed to produce three (3) phase HVAC, and more or less power switches 124 and power modules 126 could be used for single phase, dual phase, or greater than three phase HVAC output operation, where the gate driver circuitry 175 would trigger the power switches 124 appropriately. More information on driving the power switches 124 will be provided when describing the gate driver circuitry 175 and the controller board 170.

The DC-DC converter circuitry or DCDC board 130 in an aspect performs a pre-charge function for the DC capacitors 116. When a voltage source is connected to the motor controller 100 it is highly desirable to have a current limiting function that enables the DC capacitors 116 to be safely charged to a voltage that allows safe connection of the full DC link power from the HVDC input connectors 107. That is, before the HVDC input power 107 is applied to the DC capacitors 116, they are pre-charged to, or nearly to, the voltage level of the HVDC input power 107, so that the full HVDC input power 107 can be applied to the motor controller 100. In the current state of the art, this current limiting functionality is typically implemented outside the motor controller. The motor controller 100 according to one or more embodiments incorporates low-voltage circuitry into the motor controller 100 to pre-charge the DC capacitors 116 by incorporating the pre-charge circuitry for the DC capacitors 116 into the motor controller 100 thereby decreasing overall weight associated with the electric power supply 100.

Figure 11:
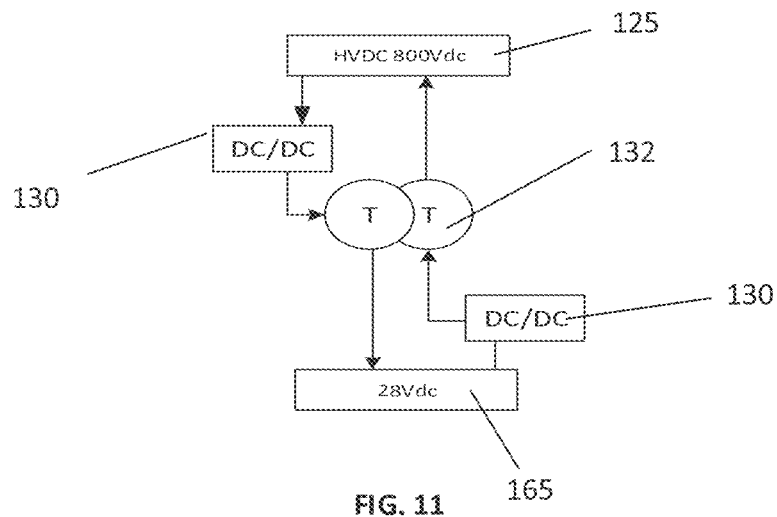
FIG. 11 shows a block diagram schematic representation of an example DC-DC converter board used in the electric power supply/motor controller of FIG. 1.

In one or more embodiments, the DC-DC converter board 130 as shown in FIGS. 5, 8, and 11 receives LVDC from the low voltage circuitry 165, preferably but not necessarily from PSU 160, and steps-up the voltage to HVDC to pre-charge the DC capacitors 116. In one or more embodiments, the DC-DC converter board 130 is supplied LVDC, e.g., twelve (12) to fifty (50) volts, preferably about eighteen (18) to about thirty-two (32) volts, more preferably about twenty-eight (28) volts DC. The DC-DC converter board 130 pre-charges the DC capacitors 116 to, or nearly to, the voltage level of the HVDC input 107. In this regard, in one or more embodiments, the DC-DC converter board 130 is implemented using a DC boost circuit that is added to the onboard DC-DC converter to step-up the LVDC to HVDC. The DC boost circuit converts the LVDC, for example about eighteen (18) to about thirty-two (32) volts, preferably 28 volts DC, to a higher voltage, in this application about 500 volts to 850 volts, more preferably to a voltage level equal or comparable to the voltage from HVDC input 107, in order to charge the DC capacitors 116 to comparable voltage levels in order to minimize the inrush current when the full DC voltage from HVDC input 107 is connected to the motor controller 100, and the motor. In an aspect, the DCDC converter board 130 utilizes one or more transformers 132 to step-up the voltage from LVDC to HVDC to pre-charge the DC capacitors 116. The DCDC converter board 130 pre-charges the DC capacitors 116 during start-up before the motor controller receives HVDC power.

After the DC capacitors 116 are charged to the voltage level, or to a comparable voltage level, of the HVDC input 107, or within a threshold of the HVDC input 107, the DC voltage from the DC-DC converter board 130 is no longer utilized, and, in an aspect, the DC-DC board 130 isolates from the HVDC circuit 125. After the DC capacitors 116 are pre-charged to the voltage level of the HVDC input 107, and during operation of the high voltage circuitry 125 to produce high-power, HVAC output 108, for example during operation of the power switches 124, the DCDC converter board 130 and voltage step-up circuitry no longer charges the DC capacitors 116. As the threshold pre-charge voltage level is reached, the DCDC converter circuitry 130 in an embodiment is disconnected and/or disabled and the HVDC power source is connected.

In one or more embodiments, the DCDC board 130 also optionally produces LVDC from the HVDC input 107 on the high-voltage (HV) circuit side 125 of the motor controller 100. In one or more embodiments, the motor controller 100 has a Power Supply Unit (PSU) 160 which is supplied LVDC from LVDC input 106, and optionally in an embodiment can receive LVDC produced from DCDC converter board 130, in an aspect, in the event that the LVDC power source to connector 106 should fail. In one or more embodiments, the motor controller 100 detects that the LVDC supply is interrupted and the DC to DC converter circuitry 130 is activated to generate LVDC from the HVDC input power. That is, DCDC converter board 130 can receive HVDC from power inputs 107 and step down the HVDC from the high-voltage circuit side 125 to supply PSU 160, and/or power the control, monitoring, and auxiliary circuit boards with LVDC. In one or more embodiments, the one or more transformers 132 in the DCDC converter board 130 used to step-up the LVDC to pre-charge the capacitors 116, can be used to step-down the voltage from the HVDC input power 107 to LVDC used to power the PSU 160, and/or the various control and monitoring circuits, e.g., controller board 170 and gate driver board 175. In this manner, the DCDC converter board 130 can serve as a redundant power source to supply LVDC to circuitry 165, and in an example embodiment serve as a power source for the PSU 160.

The DCDC converter board 130 preferably steps the HVDC down to between twelve (12) and fifty (50) volts, preferably between about eighteen (18) to about thirty-two (32) volts, more preferably down to about 28 volts, and serves as a potential local LVDC generator to power the low voltage circuitry 165 including the controller board 170. The dual functions of the DCDC converter board 130 are schematically illustrated in FIG. 11 where there is a LVDC input bus of 28 Vdc to the DCDC converter board 130 and the corresponding DC capacitor pre-charge output, and HVDC bus input to DCDC converter board 130 and corresponding local 28 Vdc output. The DCDC converter circuitry 130 also provides galvanic insulation between the HVDC circuitry 125 and the LVDC circuitry 165. The transformer used to step-up and step-down the voltage insulates the high-voltage and low-voltage circuitry by providing mechanical, physical, and electrical segregation between both the HVDC and LVDC sides.

The PSU 160 shown in FIG. 8, in one or more embodiments, supplies LVDC to the controller board 170, the gate driver board 175, and/or the DCDC converter board 130. The PSU 160 in an embodiment is located on controller board 170. The controller board 170 serves as the brain of the motor controller 100. The controller board 170 contains processors and ancillary circuitry to run the electric appliance, e.g., electric motor, to run the control and monitoring functions and software, to communicate with other motor controllers 100, and, if configured, to communicate with a system controller. The controller board 170 performs internal temperature monitoring from one or more internal sensors 162 (e.g., temperature sensors 162), and contains the circuitry to read and convert signals from external temperature sensors (such as may be mounted in the motor) for use by control and monitoring software. The controller board 170 can receive other sensor and monitoring inputs, such as, for example, inputs from one or more motors and/or internal current and voltage sensors, to control the motor controller 100 and detect faults. The controller board 170 is mounted outboard of the DC capacitors 116 as shown in FIGS. 5-6.

Figure 12:
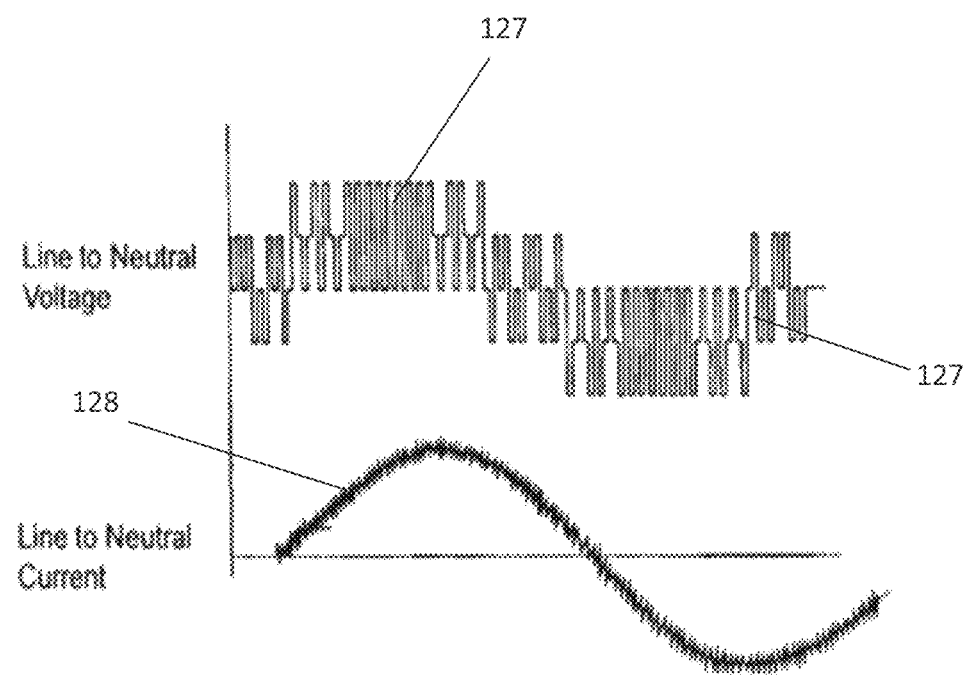
FIG. 12 shows the output voltage and current of the electric power supply/motor controller of FIG. 1.

The controller board 170 also controls the gate driver board 175 and more specifically provides the timing to the gate driver board 175 to trigger the power switches 124 on and off. More specifically the gate driver board 175 acts as an actuator for the power switches 124 by providing a trigger, e.g., a voltage signal, to the gate of each of the power switches 124 to turn on the power switches 124 and permit current to flow. When the gate receives a trigger, e.g., a voltage signal, the voltage quickly rises to the level of the HVDC applied to the power switch 124 from the HVDC circuitry 125 and current flows through the power transistor (e.g., SiC MosFet) 124. More particularly, the controller board 170 provides the timing regarding when and for how long the gate of the power switch 124 is triggered, e.g., the pulse width modulation (PWM) that the gate driver circuitry 175 provides to the power switches 124. FIG. 12 shows the power output 108 of one phase of the motor controller 100 with the voltage pulses 127, e.g., square waves 127, and alternating current 128, e.g., sinusoidal wave 128, produced by the power switches 124. Each power output 108', 108", 108''' preferably has the same output as shown in FIG. 12, just phase shifted 120 degrees. The controller board 170 provides the timing for the gate driver board circuitry 175 to trigger each power switch 124 in each of the three power modules 126 to produce the three-phase HVAC output of the motor controller 100. That is, the controller board 170 provides the timing of six (6) signals, one signal to each gate of each power switch 124 so that each power module 126 provides HVAC out-of-phase with the other power modules 126. It should be appreciated that if there were more or less power switches 124, the gate driver board 175 would apply a triggering signal to each power switch 124 whose timing would be controlled by the circuitry and logic in the controller board 170 to produce HVAC as the output of the additional power module 126 and power switches 124.

Figure 13:
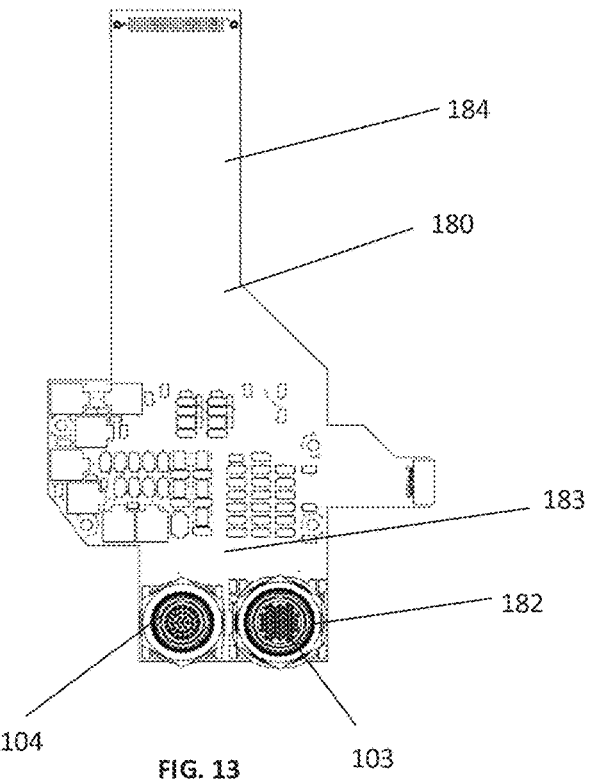
FIG. 13 shows an example lightening board used in the electric power supply/motor controller of FIG. 1.

Motor controller 100 preferably includes an example lightening board 180, as shown in FIGS. 5, 8, and 13. The lightening board 180 receives the input signals 103 from the electric motor, and the input signals 104 from system sensors, or if applicable, a system controller. The lightening board 180 protects incoming signals from voltage or current spikes in the event of a lightening strike or other voltage or current spike. The lightening board 180 uses one or more diodes to protect against the incoming signals having a voltage or current spike. The lightening board 180 extends from the input connectors 102 (103 and 104) at the front side of the motor controller housing 105 to the controller board 170 at the back of the housing 105. The lightening board 180 as seen in FIG. 13 includes a first portion 182 of the board 180 containing the input signal connectors 102 at a right angle to a second portion 184 of the board that extends to the controller board 170. The lightening board 180 contains a flexible portion 183 to provide a right angle between the first portion 182 and second portion 184 of the printed circuit board (pcb) 180 for packaging purposes in the motor controller housing 105.

Another optional feature of the power supply, e.g., motor controller 100, is a highly integrated common mode EMI noise suppression filter 140 and ground fault detection (GFD) 150. The input common mode EMI filter 140 is used to avoid and/or reduce electromagnetic interference (EMI) and/or electromagnetic conductance (EMC). In an aspect, the EMI filter 140 protects the HVDC power source from conducted EMI. As shown in FIGS. 5, 7, and 14-17, the EMI filter 140 receives HVDC power at its front end 142 from connectors 107 and delivers the input power to the power bus bar 117 and in particular to the middle connector 118 of the bus bar 117. The back end 144 of the EMI filter 140 contains two feet 146, 148 which each rest on and connect to the middle connector 118 of the bus bar 117. The EMI filter 140 contains two conductors or rails 141, 143 shaped as half cylinders that are isolated from each other by insulation 147. It will be appreciated that the rails 141, 143 and insulator 147 can configured into and form different shapes. The insulator 147 is sufficient to protect against a short between the two rails 141, 143 carrying the HVDC. The conductors 141, 143 and insulator 147 are configured to be able to handle the high-power, e.g., the high-voltage and current, to be input to the motor controller 100. The two conductor rails 141, 143 and insulator 147 form a round shaft portion 149 that extends between the front end portion 142 and the back end portion 144 of the EMI Filter 140 and delivers the HVDC power from the input connectors 107 to the bus bar 117.

Figures 14, 15:
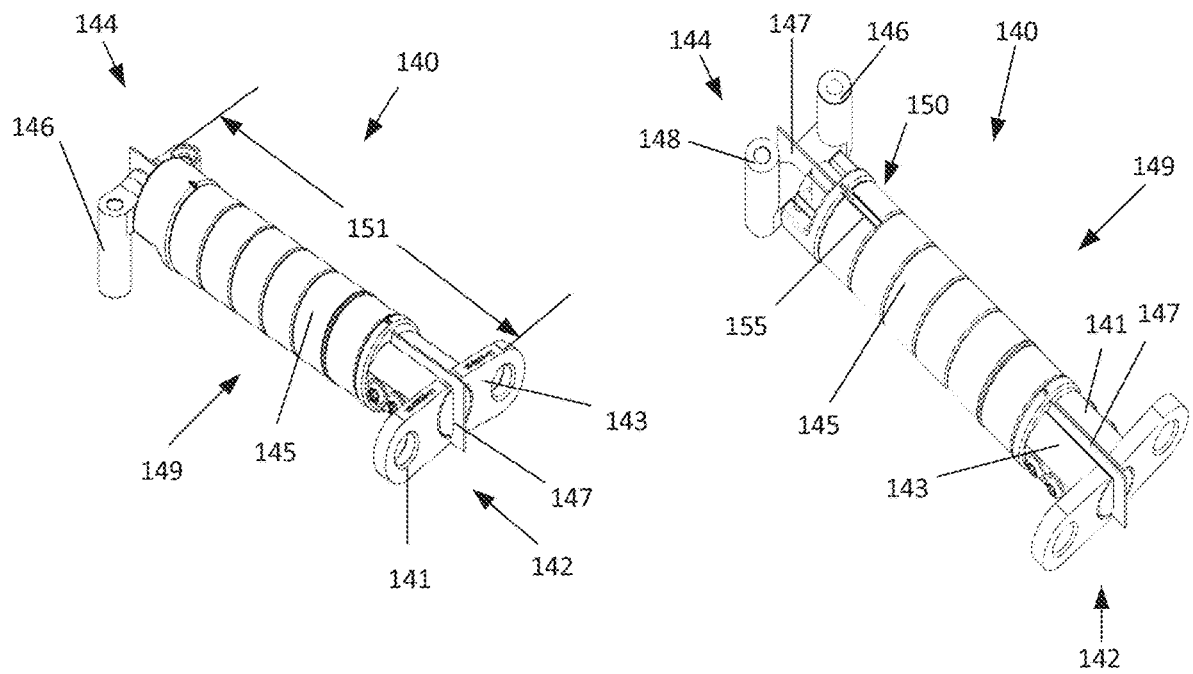
FIG. 14 shows a top perspective view of an example integrated EMI Filter and Ground Fault Detection Unit used in the electric power supply/motor controller of FIG. 1.
FIG. 15 shows a bottom perspective view of the example integrated EMI Filter and Ground Fault Detection Unit of FIG. 14.
Figure 16:
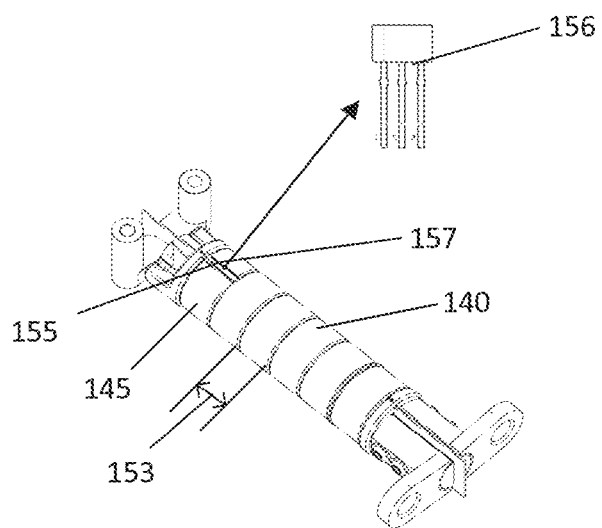
FIG. 16 shows an exploded representation of an embodiment of the Ground Fault Detection Unit incorporated in the EMI Filter of FIGS. 14-15.
Figure 17:
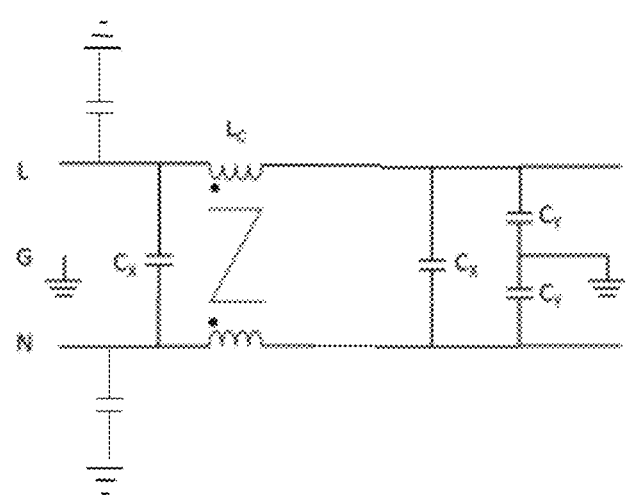
FIG. 17 shows a schematic representation of the EMI Filter in the power supply/motor controller of FIG. 1.

Surrounding the shaft portion 149 of the EMI filter 140 are one or more ferrite rings 145 that suppress EMI. In an embodiment, there are a plurality of ferrite rings 145, for example six (6) ferrite rings 145, that surround the shaft portion 149 of the EMI filter 140 and suppress EMI. In an embodiment as shown in FIGS. 14-16, the ferrite rings 145 enclose or surround the majority of the length 151 of the shaft 149 of the EMI Filter 140, and in an aspect surrounds substantially the entire shaft length 151. In an aspect, a small portion of the shaft portion 149 is not surrounded by the ferrite rings 145 to permit leads to connect to the controller board 170. The EMI Filter 140 has a length 151 of approximately 160 mm to approximately 165 mm, the conductor rails 141, 143 and insulator 147 combined have a diameter of approximately 18 mm, and the ferrite rings 145 each have an outer diameter 152 of about 29 mm, and inner diameter of about 18 to about 19 mm to permit the conductors 141, 143 to pass through, and each ferrite ring 145 has a length 153 of approximately 14 to approximately 16 mm. While six (6) ferrite rings are shown and used in the example EMI filter 140, it should be appreciated that more or less ferrite rings may be utilized, including a single ferrite ring, and the outer diameter 151, the inner diameter, and the length 153 of each ferrite ring 145 can vary. The EMI filter 140 is used to cutoff common mode noises going to the source power. The ferrite rings 145 have a total inductance that in combination with the capacitance in the capacitors on the DCDC converter board 130 that is in proximity to the EMI filter 140 provides a sufficient low pass filter to cut off the common mode current. The structure of the EMI filter 140 utilizes CLC topology where the inductance from the ferrite rings 145 combines with the capacitance from the capacitors on DCDC converter board 130 in proximity to the ferrite rings 145 to cover all of the frequency spectrum defined by the DO160-G: LHM standard, (e.g., 150 kHz to 30 MHz). A representative circuit of the inductance of the EMI filter 140 and the capacitance coupling is shown in FIG. 17. In the example embodiment of the EMI Filter 140 the total inductance of the plurality of ferrite rings 145 is about 35-70 micro-Henrys, more preferably about 45-50 micro-Henrys and the total capacitance on the DCDC converter board 130 in proximity to the ferrite rings 145 is about 1-5 micro-Farads, more preferably about 2 micro-Farads.

The Ground Fault Detection (GFD) unit 150 in an embodiment is integrated with the EMI filter 140 and mounted in the same bus bay as the EMI Filter 140. The GFD unit 150 prevents ground faults and in an aspect incorporates a sensing element 155 to determine if there is leakage of current to ground. Detecting whether there is current leakage to ground in one or more embodiments is achieved by summing the positive and negative current leakage from the DC rails 141 and 143 and triggering an alert if a threshold on the leakage current is exceeded. In one or more embodiments, the sensing element 155 is one or more Hall effect sensors 156 that measure the current, and in an aspect one or more linear Hall effect sensors 156 are integrated with and configured in a gap 157 in one or more of ferrite rings 145 forming the EMI filter 140 as shown in FIG. 16. The signals from the sensing elements, e.g., the linear Hall effect sensors, are transmitted to the leads on the shaft portion 149 of the EMI Filter 140, and from the leads are transmitted to and received by the controller board 170 where the information from the sensing element(s) 155 are processed. The integrated EMI filter 140 and GFD 150 is light weight weighing about 415 to about 425 grams, more preferably about 420 grams and takes up low volume of about 160 mm×30 mm×30 mm.

The motor controller 100 further optionally includes EMI shielding 158 illustrated in FIG. 6 which is a thin sheet formed of metallic material, for example a foil, and which acts as a Faraday cage to prevent electro-magnetic emissions from escaping the motor controller 100. The EMI shielding 158 is preferably located in proximity to the HVAC portion of the high-voltage circuitry 125, including in proximity to the HVAC output 108 and power modules 126 connected to the HVAC output 108.

The power supply/motor controller 100 in one or more embodiments includes a cooling system 190, preferably a liquid cooling system to keep the temperature of the circuits and components within a desirable temperature range and prevent a rapid temperature rise inside the housing 105. The cooling system 190 is formed on the underside of the housing 105 as shown in FIG. 18 and has an underside cover plate 191 as shown in FIG. 19. The underside cover plate 191 forms a liquid seal with the housing 105 to retain the liquid coolant from leaking. There are no seams or seals to leak inside the compartment 198 of the motor controller housing 105 that contains the electronics and circuits, e.g., the high-voltage circuits 125 or low-voltage circuits 165. The liquid coolant in one or more embodiments is silicon or turbine oil, although other fluids are contemplated as appropriate coolants. The cooling system has an inlet 192 for coolant, a winding conduit or channel 193 for the coolant to traverse, and an outlet 194. The volume of the channel 193 within the housing 105 is about 300 ml to 500 ml for an example motor controller 100, with the volume increasing to about 600 ml to 1 liter for a double sized motor controller described herein.

The coolant in an embodiment enters through inlet 192, traverses the channel 193, and exits the outlet 194 under 2.5 to 6 bars of pressure with a pressure drop of about 600 mbars. The material forming the common wall or surface 196 separating the channel 193 from the inside compartment 198 of the housing 105 is preferably a good heat conductor, for example aluminum. The channel 193 is formed in the housing 105 to run under the power modules 126 and DC capacitors 116 to assist with cooling the components in the motor controller, preferably the high-voltage, high-power circuitry 125. That is, the coolant preferably flows under the DC capacitors 116 and power modules 126. In an embodiment, channel 193 would form a near loop under the DC capacitors 116. In one or more embodiments, the housing of the capacitors 116 and/or the housing or encasing of the power switches 126 are formed of heat conductive material, and further are configured to increase and maximize contact with the common wall or bottom surface 196 of the motor controller housing 105. The motor controller housing 105 includes a top cover plate 195 to cover and protect the components, circuits, and subassemblies of the power supply/motor controller 100.

Figure 20:
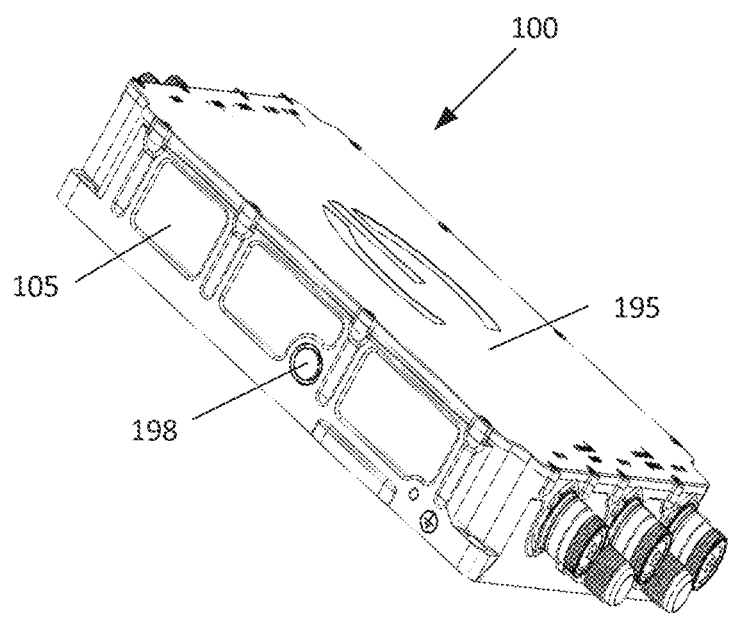
FIG. 20 illustrates a side perspective view of a vent in the housing of the electric power supply/motor controller of FIG. 1.

The housing 105 of the motor controller 100 also optionally includes vent 185 as shown in FIG. 20 to provide pressure equalization for the inside compartment 198 of the motor controller housing 105. The vent 185 preferably provides a hydrophobic and oleophobic (oil-resistant) barrier while allowing pressure equalization. Vent 185 permits weight saving to the design and structure of the housing 105 as the housing 105 does not have to bear a significant pressure gradient between the inside compartment 198 of the housing 105 and the exterior of the housing 105. In addition, since the pressure gradient is low between the inside and outside of the housing 105, the connector sealing is low. While the vent 185 has no orientation restraints, the vent preferably should not be placed against a flat wall or other location that would restrict air flow.

In an embodiment, power supply/motor controller 200 may be a double unit that produces two groups or sets of multiphase HVAC, e.g., dual, multiphase, high-power, HVAC, in one housing 205. That is, there are two sets of three-phase HVAC power outputs (six HVAC outputs altogether). In one or more embodiments, double unit motor controller 200 would have two sets of the circuitry described in connection with motor controller 100, for example two high voltage circuits 125, and two low voltage circuits 165. In an embodiment, double unit motor controller 200 would have two sets of DC capacitors 116 (four capacitors 116), two bus bars 117, two sets of three power modules 126 (six power modules 126), two DCDC converter circuits 130, two EMI Filters 140, two GRD units 150, two PSUs 160, two controller boards 170, two gate driver boards 175, two lightening boards 180, and two separate cooling systems 190. The housing 205 in an embodiment has a common interior wall segregating the inside chamber into two separate chambers each containing one of the two sets of circuits and components, one on each side of the housing, or in an alternative embodiment there is no interior wall separating the circuits and components. In an embodiment of the double unit motor controller 200 there can be one single cooling system with one single channel 293 that traverses the underside of the housing 205.

In a preferred embodiment, the electric power supply, e.g., motor controller, has Silicon Carbide power switches, a power density of about 10 kw/kg or greater, preferably greater than 14 kw/kg or greater, has an efficiency of greater than 97% (preferably greater than 98%), advanced liquid cooling and thermal performance, stable performance at high altitude, operates in unpressurised environments, has a high level of hardware and software protection, and meets the requirements of RTCA DO178C Software Considerations in Airborne Systems and Equipment Certification and RTCA D0254 Design Assurance for Airborne Electronic Hardware. Power Supply/motor controller specifications:

| | |
|---|---|
| Efficiency | 98% |
| Weight (Est.) | less than 12 kg/33 lbs |
| Interfaces | Digital communication bus CAN x2, RS485, temperature sensor PT1000, pressure sensors, rotor position RVDT Throttle Pressure sensors |

Figure 21:
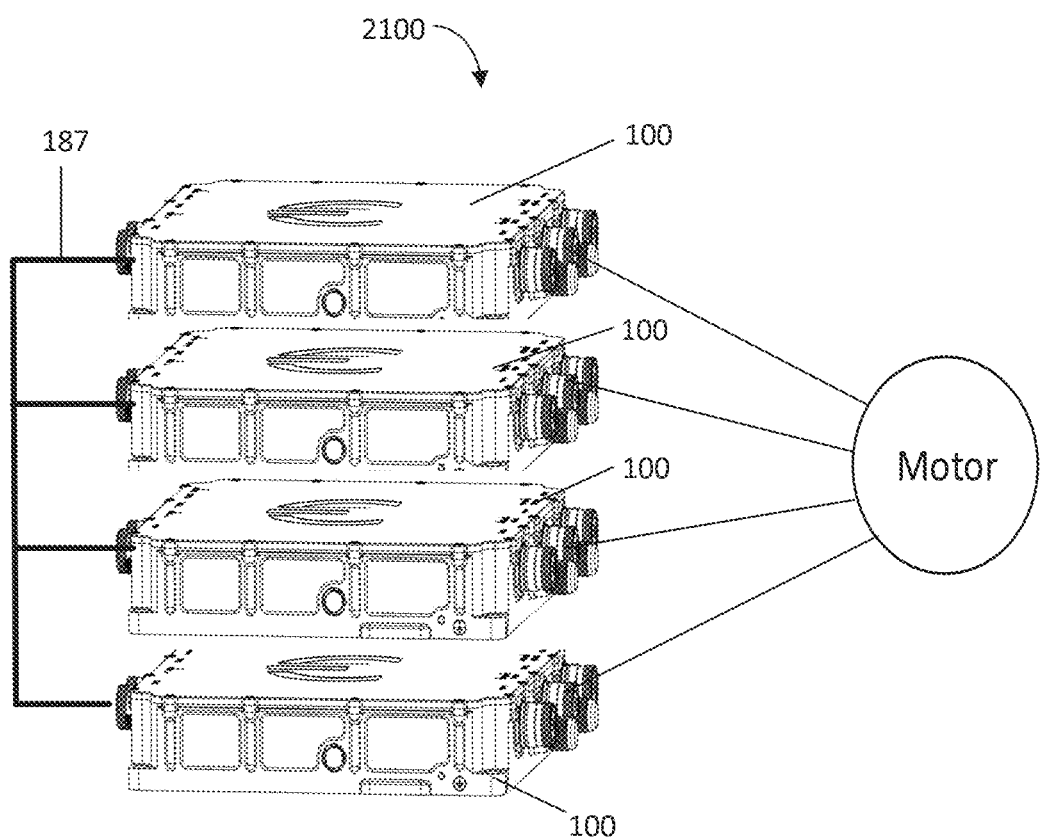
FIG. 21 illustrates a front perspective view of an embodiment of multiple electric power supply systems, e.g., voltage converts/inverters, for use in a system for supplying and controlling electric power to, for example, one or more electric motors.

In one or more embodiments, shown for example in FIG. 21, multiple motor controllers 100 are used in a system 2100 to control and deliver high-power, multi-phase HVAC preferably to one or more electric motors or motor modules. The motor controllers 100 in an aspect are largely independent and are synchronized via their input torque commands. This ensures a high level of independence in the event of local failure of a motor segment or module of the motor, motor controller power section, or control software. The electric power supplies 100, e.g., motor controllers, have a highly-modular, fault tolerant architecture providing a high level of redundancy and safety. The motor controllers 100 can use a high speed bus 187, e.g., link(s), between the motor controllers 100 which controls and monitors the electric motor, or other apparatus or system that is supplied power. The high speed bus 187 can be used to transfer data, such as, for example, motor shaft positions and faults. The modularity and ability to use multiple motor controllers 100, or one or more double unit motor controllers 200, with redundant circuits, provides a level of redundancy and safety as faults can be isolated and the system 2100 (e.g., multiple motor controllers) can operate in degraded mode and remain operational.

An electric power supply is disclosed where the electric power supply includes a number of individual features and functions that may be employed individually or in combination. In an embodiment the electric power supply includes: high-voltage, direct-current (HVDC) circuitry comprising one or more DC pre-charge capacitors and one or more power transistor switches, the HVDC circuitry adapted and configured to receive high-voltage, direct-current (HVDC) input of about 320 volts and/or greater and convert the HVDC input power to multi-phase, high-voltage, alternating-current (HVAC) output power of about 230 volts and/or greater; low-voltage, direct current (LVDC) circuitry adapted and configured to operate on low-voltage, direct-current of about fifty volts and/or less, wherein the LVDC circuitry is configured to control and monitor the multi-phase HVAC output power. The electric power supply in one or more embodiments is further configured to receive multiphase, high-voltage, alternating-current (HVAC) input power of about 230 volts and/or greater and convert the multiphase HVAC input power to high-voltage, direct-current (HVDC) output power of about 320 volts and/or greater, preferably using the HVDC circuitry used to convert the HVDC input power to HVAC output power. In an aspect the electric power supply further includes DC to DC converter circuitry adapted and configured to receive and convert the low-voltage, direct-current to high-voltage, direct current of about 320 volts and/or greater to pre-charge the DC pre-charge capacitors. The DC to DC converter circuitry in an embodiment pre-charges the DC pre-charge capacitors during start-up and upon the DC pre-charge capacitors being charged to within a threshold of or to the HVDC input voltage, the DC to DC converter circuitry no longer charges the DC pre-charge capacitors. Another feature, the DC to DC converter circuitry is configured to not charge the DC pre-charge capacitors when the power transistor switches are operational. In a further aspect, the DC to DC converter is configured to receive and convert the HVDC input power to the low-voltage, direct current.

In a further embodiment the power transistor switches comprise Silicon Carbide MosFET power switches, and in an aspect two Silicon Carbide MosFET power switches are configured on a power module and each power module is configured to produce one phase of the multi-phase HVAC output. In a specific optional embodiment, the electric power supply has three power modules and the HVDC circuitry is configured to produce three-phases of HVAC output wherein each power module produces one phase of HVAC output and each power module is configured to shift its HVAC output from the other power modules. The electric power supply can include gate driver circuitry to trigger the power transistor switches.

The HVAC circuitry in one or more embodiments of the electric power supply further includes an EMI filter, the EMI filter having two electrically insulated rails configured and adapted to receive the HVDC, wherein the two electrically insulated rails have ferrite material at least partially surrounding the two rails. The EMI filter in an optional embodiment incorporates a ground fault detection unit. The ground fault detection unit in an embodiment includes a hall-effect sensor, and in an aspect the hall-effect sensor is positioned in a gap in the ferrite material and is configured to measure current in the ferrite material. In a further embodiment the two electrically insulated rails in the EMI filter are configured as a shaft having a substantially circular cross-section, and the ferrite material is formed as one or more rings surrounding the shaft, and optionally the EMI filter incorporates a ground fault detection unit that comprises a hall-effect sensor wherein the hall-effect sensor is positioned in a gap formed in at least one of the one or more of the ferrite rings, and the hall-effect sensor is configured to measure current in the ferrite rings. In yet a further embodiment, the two electrically insulated rails of the EMI filter deliver the HVDC input power to a bus bar adjacent DC pre-charge capacitors to deliver HVDC input power to the DC pre-charge capacitors. The DC pre-charge capacitors in an aspect comprise two DC pre-charge capacitors and the EMI filter extends between the two DC pre-charge capacitors from input connectors to a bus bar to deliver HVDC input power to the DC capacitors. In an aspect the EMI filter has inductance of about 35 to about 70 micro-Henrys and is positioned in proximity to one or more capacitors having a capacitance of about 1 to about 5 micro-Farads to provide a low pass filter to cutoff common mode current.

The LVDC circuitry in the electric power supply in an embodiment further includes controller circuitry having a processor and other ancillary circuitry to run monitoring software. The controller circuitry optionally has circuitry to read temperature and pressure sensor data, and in an aspect the electric power supply has input connectors communicating with the controller circuitry to read temperature sensor data. The electric power supply in an embodiment further includes a housing to contain and protect the HVDC circuitry, the LVDC circuitry, and the DC to DC converter circuitry, as well as other components and circuits, where in an aspect the housing has one or more coolant input connectors and one or more coolant output connectors, the one or more input connectors connected to a flow path through the power supply that communicates with the one or more coolant output connectors, the coolant input connectors and flow path configured and adapted to receive liquid coolant. The electric power supply with the housing and liquid coolant in an embodiment is configured to have a power density of 10 kw per kg and/or greater, and in an aspect while producing 50 kilowatts of power and/or greater. The electric power supply in one or more embodiments is about 97% efficient or better, and has a reduced power loss for overvoltage spikes of about 16 kV/µs or less. The housing for the electric power supply in an embodiment further has a vent to equalize pressure between the interior and exterior of the housing.

The electric power supply in one or more embodiments is configured as a motor controller to power and control an electric motor. An electric power supply system is also disclosed that includes two or more electric power supplies where each power supply is modular and scalable. The electric power supply system in one or more embodiments includes a high-speed communication link between the two or more electric power supplies to communicate between the two or more electric power supplies. In a further aspect, the electric supply system is capable of operating if one or more of the electric power supplies is degraded, faulty, or inoperable. The electric power supply system in one or more embodiments is configured as a motor controller to power and control an electric motor.

With respect to the above description, it is to be realized that the dimensional relationship for the parts of the system includes variations in size, materials, shape, form, function and the manner of operation as would be known to one skilled in the art, and all equivalent relationships to those illustrated in the drawings and described in the specification are intended to be encompassed by the invention.

Those skilled in the art will recognize that the disclosed and illustrated electric power supply, voltage converter/inverter, and/or motor controller have many applications, may be implemented in various manners and, as such is not to be limited by the foregoing embodiments and examples, but it is intended to cover modifications within the spirit and scope of the invention. While fundamental and optional features of the invention have been shown and described in exemplary embodiments, it will be understood that omissions, substitutions, and changes in the form and details of the disclosed embodiments of the electric power supply, voltage converter/inverter and/or motor controller can be made by those skilled in the art without departing from the spirit of the invention. Any number of the features of the different embodiments described herein may be combined into a single embodiment. The locations of particular elements, for example, the electric power connectors, outputs, circuitry, etc., may be altered.

Alternate embodiments are possible that have features in addition to those described herein or may have less than all the features described. Functionality may also be, in whole or in part, distributed among multiple components, in manners now known or to become known. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

In the claims, the term "comprises/comprising" does not exclude the presence of other elements, features, or steps. Furthermore, although individually listed, a plurality of means, elements, or method steps may be implemented by, e.g., a single unit, element, or piece. Additionally, although individual features may be included in different claims, these may advantageously be combined, and their inclusion individually in different claims does not imply that a combination of features is not feasible and/or advantageous. In addition, singular references do not exclude a plurality. The terms "a", "an", "first", "second", etc., do not preclude a plurality. Reference signs or characters in the disclosure and/or claims are provided merely as a clarifying example and shall not be construed as limiting the scope of the claims in any way.

We claim:

1. An electric power supply, the electric power supply comprising:
    direct-current (DC) to alternating-current (AC) circuitry adapted and configured to receive DC power input having a DC input voltage of about 320 DC volts to about 820 DC volts and convert the DC power input to multi-phase, alternating-current (AC) power output that ranges from ten (10) Hertz to as high as a thousand (1000) Hertz,
    wherein the DC to AC circuitry further comprises:
    at least two DC capacitors; and
    an electromagnetic interference (EMI) noise filter to suppress EMI noise, wherein the EMI noise filter comprises two, electrically insulated, conductive rails configured side by side as a linearly extending shaft having a length and a cross-section and adapted to receive the DC power input, ferrite material formed as one or more elements substantially circumscribing the two conductive rails and extending a majority of the length of the two conductive rails, and a current sensing element positioned in a gap in the one or more elements formed of ferrite material and configured to measure leakage current escaping to ground,
    wherein the two electrically insulated, conductive rails of the EMI noise filter are physically located and extend lengthwise at least partially between the at least two DC capacitors and delivers the DC power input to the at least two DC capacitors.

2. The electric power supply of claim 1, wherein the current sensing element comprises a hall-effect sensor.

3. The power supply of claim 1, wherein the EMI noise filter delivers the DC power input to a bus bar for delivery of the DC power input to one or more DC capacitors.

4. The electric power supply of claim 1, wherein the EMI noise filter has inductance of about 35 to about 70 micro-Henrys and is positioned in proximity to one or more capacitors having a capacitance of about 1 to about 5 micro-Farads to provide a low pass filter to cutoff common mode current.

5. The power supply of claim 1, further comprising a housing to contain and protect at least the DC to AC circuitry, wherein the housing has a housing length in the same direction as a length of the two, electrically insulated, conductive rails of the EMI noise filter, wherein the length of the two, electrically insulated, conductive rails is approximately fifty percent of the housing length.

6. The electric power supply of claim 1, further comprising low-voltage, direct current (LVDC) circuitry adapted and configured to operate on LVDC power of about fifty volts or less, wherein the LVDC circuitry is configured to control and monitor the multi-phase AC power output.

7. The electric power supply of claim 1, wherein the DC to AC circuitry converts multiphase AC power input to direct-current (DC) power output.

8. A motor controller system comprising two or more electric power supplies of claim 1, wherein each electric power supply is modular and scalable and delivers the multiphase, AC power output.

9. The motor controller system of claim 8, further comprises a high-speed bus between the two or more electric power supplies to transmit data between the two or more electric power supplies, wherein the system is capable of operating if one or more of the electric power supplies is at least one of a group consisting of: degraded, faulty, inoperable, and combinations thereof.

10. An electric power supply, the electric power supply comprising:
    direct-current (DC) to alternating-current (AC) circuitry comprising two or more DC capacitors electrically connected in parallel and one or more power transistor switches, the DC to AC circuitry adapted and configured to receive DC power input having a DC input voltage of about 320 to about 820 DC volts and a DC input current of about 100 to about 400 amps and convert the DC power input to multi-phase, alternating-current (AC) power output; and
    low-voltage, direct current (LVDC) circuitry adapted and configured to operate on LVDC power of about fifty volts or less, wherein the LVDC circuitry is configured to control and monitor the multi-phase AC power output,
    wherein the DC to AC circuitry further comprises an electromagnetic interference (EMI) noise filter to suppress EMI noise, wherein the EMI noise filter comprises two, electrically insulated, conductive rails configured side by side as a linearly extending shaft having a length and a cross-section and adapted to receive the DC power input, ferrite material formed as one or more elements substantially circumscribing the two conductive rails and extending a substantial majority of the length of the two conductive rails, and a current sensing element positioned in a gap in the one or more elements of ferrite material substantially circumscribing the two conductive rails and configured to measure leakage current escaping to ground, wherein the two electrically insulated, conductive rails of the EMI noise filter are physically located and extend at least partially between the two or more DC capacitors that are electrically connected in parallel and delivers the DC power input to the at least two or more DC capacitors.

11. The electric power supply of claim 10, wherein the current sensing element comprises a hall-effect sensor.

12. The power supply of claim 10, wherein the EMI noise filter delivers the DC power input to a bus bar for delivery of the DC power input to the one or more DC capacitors.

13. The electric power supply of claim 10, wherein the EMI noise filter has inductance of about 35 to about 70 micro-Henrys and is positioned in proximity to one or more capacitors having a capacitance of about 1 to about 5 micro-Farads to provide a low pass filter to cutoff common mode current.

14. The power supply of claim 10, further comprising a housing to contain and protect at least the DC to AC circuitry, wherein the housing has a housing length in the same direction as a length of the two, electrically insulated, conductive rails of the EMI noise filter, wherein the length of the two, electrically insulated, conductive rails is approximately fifty percent of the housing length.

15. The electric power supply of claim 10, further comprising DC to DC converter circuitry configured to receive and convert the DC power input to the LVDC power and configured to receive and convert the LVDC power to DC power to pre-charge the DC capacitors.

16. The electric power supply of claim 10, further comprising DC to DC converter circuitry to pre-charge the DC capacitors during start-up and upon the DC capacitors being charged to within a threshold of or to the DC input voltage, the DC to DC converter circuitry no longer charges the DC capacitors.

17. The electric power supply of claim 10, wherein the power transistor switches comprise Silicon Carbide MosFET power switches and two Silicon Carbide MosFET power switches are configured to produce one phase of the multi-phase AC power output.

18. The electric power supply of claim 17, comprising three power modules wherein each power module comprises two Silicon Carbide MosFET power switches and wherein the DC to AC circuitry is configured to produce three-phases of AC power output wherein each power module is configured to shift its phase of AC power output from the phase of the other power modules.

19. The electric power supply of claim 10, wherein the multiphase AC power output ranges from ten (10) Hertz to as high as 1000 Hertz.

20. The electric power supply of claim 10, further comprising a housing to contain and protect the DC to AC circuitry and the LVDC circuitry, wherein the housing further comprises a flow path through the power supply configured and adapted to receive liquid coolant, wherein the flow path communicates with one or more coolant inputs and one or more coolant outputs.

21. The electric power supply of claim 20, wherein the power supply with the housing and liquid coolant has a power density of 10 kw per kg or greater.

22. The electric power supply of claim 10, further comprising a connector for receiving an input signal to controls the AC power output.

23. The electric power supply of claim 1, wherein the one or more elements of ferrite material substantially circumscribing the two conductive rails extend a substantial majority of the length of the two conductive rails.

24. The electric power supply of claim 1, wherein the at least two DC capacitors are electrically connected in parallel.

25. The electric power supply of claim 1, further comprising DC to DC converter circuitry to pre-charge the at least two DC capacitors during start up and upon the at least two DC capacitors being charged within a threshold of or to a DC input voltage, the DC to DC converter circuitry no longer charges the at least two DC capacitors.

26. The electric power supply of claim 1, wherein the one or more elements of ferrite are configured as one or more rings, wherein the gap is formed in at least one of the one or more rings.

27. The electric power supply of claim 1, wherein the DC power input has a DC current of about 100 amps to about 400 amps and a thickness of each of the two side by side conductive rails is greater than 1 mm.

28. The electric power supply of claim 1, wherein the DC to AC circuitry comprises at least two separate circuits, each separate circuit adapted and configured to receive DC power input and convert the DC power input to the multi-phase, alternating-current (AC) power output, the electric power supply further comprising a high speed bus between the two circuits to transmit data between the two or more separate circuits, wherein the electric power supply is capable of operating if one or more of the electric power supplies is at least one of a group consisting of: degraded, faulty, inoperable, and combinations thereof.

29. The electric power supply of claim 6, wherein the LVDC circuitry is configured to pre-charge the DC capacitors.

30. A motor controller system, the motor controller system comprising:
two or more electric power supplies; and
a high speed bus connected between the two or more electric power supplies to transmit data between the two or more electric power supplies, wherein each of the two or more electric power supplies comprises:
direct-current (DC) to alternating-current (AC) circuitry adapted and configured to receive DC power input having a DC input voltage and convert the DC power input to multi-phase, alternating-current (AC) power output,
wherein the DC to AC circuitry further comprises an electromagnetic interference (EMI) noise filter to suppress EMI noise, wherein the EMI noise filter comprises two, electrically insulated, conductive rails configured and adapted to receive the DC power input, ferrite material at least partially surrounding the two conductive rails, and a current sensing element positioned in a gap in the ferrite material and configured to measure leakage current escaping to ground; and
wherein each electric power supply is modular and scalable and delivers the multiphase AC power output; and
wherein the system is capable of operating if one or more of the electric power supplies is at least one of a group consisting of: degraded, faulty, inoperable, and combinations thereof.

* * * * *